United States Patent
Katz et al.

(10) Patent No.: US 10,303,951 B2
(45) Date of Patent: May 28, 2019

(54) AUTOMATED ANALYSIS OF IMAGE OR VIDEO DATA AND SPONSOR VALUATION

(71) Applicant: GumGum, Inc., Santa Monica, CA (US)

(72) Inventors: Jeffrey Benjamin Katz, Brookeville, MD (US); Cambron Neil Carter, Santa Monica, CA (US); Brian Jongmin Kim, Los Angeles, CA (US)

(73) Assignee: GumGum, Inc., Santa Monica, CA (US)

( * ) Notice: Subject to any disclaimer, the term of this patent is extended or adjusted under 35 U.S.C. 154(b) by 0 days.

(21) Appl. No.: 15/709,117

(22) Filed: Sep. 19, 2017

(65) Prior Publication Data

US 2018/0084309 A1 Mar. 22, 2018

Related U.S. Application Data

(60) Provisional application No. 62/397,739, filed on Sep. 21, 2016, provisional application No. 62/421,886, (Continued)

(51) Int. Cl.
*G06K 9/00* (2006.01)
*G06K 9/62* (2006.01)
(Continued)

(52) U.S. Cl.
CPC ..... *G06K 9/00744* (2013.01); *G06F 17/3079* (2013.01); *G06F 17/30784* (2013.01);
(Continued)

(58) Field of Classification Search
None
See application file for complete search history.

(56) References Cited

U.S. PATENT DOCUMENTS 8,036,932 B2  10/2011  Cline, Jr.
8,036,990 B1  10/2011  Mir et al.
(Continued)

FOREIGN PATENT DOCUMENTS

EP   2922061 A1   9/2015

OTHER PUBLICATIONS

Kovar and Hanjalic, Logo detection and classification in sport video—video indexing for sponsorship revenue control, 2002, Proceedings of SPIE, vol. 4676, 2002 (Year: 2002).*

(Continued)

*Primary Examiner* — Hoang Vu A Nguyen Ba
(74) *Attorney, Agent, or Firm* — Knobbe, Martens, Olson & Bear, LLP

(57) ABSTRACT

Systems and methods are provided for analyzing images or video using computer vision. Media items, including images or videos, are retrieved from one or more media channels, such as social media network services, streaming media networks, or broadcast networks. A media item is identified that depicts a object associated with a sponsor. A media cost equivalent is determined that is associated with the media item as distributed by the media channels. Using computer vision, a percentage is determined for the media cost equivalent. The percentage is determined based at least in part on at least one of size, clarity, duration or position of the sponsor object or another object in the media item. A sponsor valuation is calculated based at least in part on the media cost equivalent adjusted by the percentage.

19 Claims, 13 Drawing Sheets

Related U.S. Application Data filed on Nov. 14, 2016, provisional application No. 62/505,758, filed on May 12, 2017.

(51) Int. Cl.

| | |
|---|---|
| *G06K 9/68* | (2006.01) |
| *G06T 7/62* | (2017.01) |
| *G06T 7/70* | (2017.01) |
| *G06F 17/30* | (2006.01) |
| *G06N 99/00* | (2019.01) |
| *G06Q 30/02* | (2012.01) |
| *H04H 60/48* | (2008.01) |
| *H04H 60/59* | (2008.01) |
| *H04H 60/63* | (2008.01) |
| *H04H 60/66* | (2008.01) |
| *H04N 21/24* | (2011.01) |
| *H04N 21/44* | (2011.01) |
| *H04N 21/81* | (2011.01) |
| *H04N 21/232* | (2011.01) |
| *H04N 21/234* | (2011.01) |
| *H04N 21/2387* | (2011.01) |
| *H04N 21/2547* | (2011.01) |
| *H04N 21/2187* | (2011.01) |
| *H04N 21/442* | (2011.01) |
| *H04N 21/262* | (2011.01) |
| *H04N 21/414* | (2011.01) |
| *H04N 21/2665* | (2011.01) |
| *H04N 21/658* | (2011.01) |
| *H04H 60/47* | (2008.01) |
| *G06F 3/0484* | (2013.01) |
| *G06F 3/0488* | (2013.01) |

(52) U.S. Cl.

CPC ..... *G06K 9/00718* (2013.01); *G06K 9/00724* (2013.01); *G06K 9/6256* (2013.01); *G06K 9/6267* (2013.01); *G06K 9/6274* (2013.01); *G06K 9/6878* (2013.01); *G06N 99/005* (2013.01); *G06Q 30/0242* (2013.01); *G06Q 30/0273* (2013.01); *G06Q 30/0275* (2013.01); *G06T 7/62* (2017.01); *G06T 7/70* (2017.01); *H04H 60/48* (2013.01); *H04H 60/59* (2013.01); *H04H 60/63* (2013.01); *H04H 60/66* (2013.01); *H04N 21/2187* (2013.01); *H04N 21/232* (2013.01); *H04N 21/2387* (2013.01); *H04N 21/23418* (2013.01); *H04N 21/2407* (2013.01); *H04N 21/2547* (2013.01); *H04N 21/2665* (2013.01); *H04N 21/26241* (2013.01); *H04N 21/41415* (2013.01); *H04N 21/44008* (2013.01); *H04N 21/44204* (2013.01); *H04N 21/6581* (2013.01); *H04N 21/812* (2013.01); *H04N 21/8133* (2013.01); *G06F 3/04842* (2013.01); *G06F 3/04883* (2013.01); *G06K 2209/01* (2013.01); *G06K 2209/25* (2013.01); *G06T 2207/10016* (2013.01); *G06T 2207/20081* (2013.01); *G06T 2207/20084* (2013.01); *G06T 2207/30224* (2013.01); *H04H 60/47* (2013.01)

(56) References Cited

U.S. PATENT DOCUMENTS

| | | |
|---|---|---|
| 8,521,584 B1 | 8/2013 | Feng |
| 9,183,259 B1 | 11/2015 | Marra |
| 9,226,047 B2 | 12/2015 | Thorwith |
| 9,355,406 B2 | 5/2016 | Rosen |
| 9,613,296 B1 | 4/2017 | Rosen et al. |
| 9,721,394 B2 | 8/2017 | Rosenthal et al. |
| 9,892,320 B2 | 2/2018 | Oguchi et al. |
| 10,007,863 B1 | 6/2018 | Pereira |
| 2003/0091237 A1 | 5/2003 | Cohen et al. |
| 2006/0074828 A1* | 4/2006 | Heumann ............ G06K 9/6217 706/20 |
| 2007/0156615 A1* | 7/2007 | Davar ............... G06F 17/30616 706/15 |
| 2009/0300100 A1 | 12/2009 | Freer |
| 2010/0008265 A1 | 1/2010 | Freer |
| 2010/0009713 A1 | 1/2010 | Freer |
| 2013/0132311 A1* | 5/2013 | Liu ...................... G06N 99/005 706/12 |
| 2013/0212609 A1 | 8/2013 | Sinha et al. |
| 2014/0052534 A1 | 2/2014 | Gandhi |
| 2014/0249898 A1 | 9/2014 | Ostoich |
| 2014/0270354 A1* | 9/2014 | Soundararajan ..... H04N 21/812 382/103 |
| 2014/0298380 A1 | 10/2014 | Venkataswamy |
| 2015/0121421 A1 | 4/2015 | Tulsi et al. |
| 2015/0294370 A1 | 10/2015 | Nagarajayya |
| 2015/0297949 A1 | 10/2015 | Aman |
| 2016/0023118 A1* | 1/2016 | Mindes .................. A63F 13/65 463/31 |
| 2016/0098860 A1 | 4/2016 | Basra |
| 2016/0148650 A1 | 5/2016 | Laksono |
| 2016/0189200 A1 | 6/2016 | Olechowski |
| 2017/0046879 A1 | 2/2017 | Severn |
| 2018/0036641 A1 | 2/2018 | Parisi |

OTHER PUBLICATIONS

Brezeale, Darin et al., 'Automatic Video Classification: A Survey of the Literature,' IEEE Transaction on Systems, Man, and Cybernetics: Part C: Application and Reviews, IEEE Service Center, vol. 38, No. 3, May 1, 2008.

Glasberg, Ronald et al., 'New Real-Time Approaches for Video-Genre-Classification using High-Level Descriptors and a Set of Classifiers,' Semantic Computing, 2008 IEEE, Aug. 4, 2008, pp. 120-127.

International Search Report and Written Opinion for PCT Application No. PCT/US2017/052319, dated Jan. 17, 2018 in 21 pages.

Kovar, Bohumil et al., 'Logo Detection and Classification in a Sport Video: Video Indexing for Sponsorship Revenue Control,' Visual Communications and Image Processing; vol. 4676, No. 1, Jan. 1, 2001, pp. 183-193.

Oliveria, Goncalo et al., 'Automatic Graphic Logo Detection via Fast Region-based Convolutional Networks,' 2016 International Joint Conference on Neural Networks (IJCNN), IEEE, Jul. 24, 2016, pp. 985-991.

Snoek, Cees G.M. et al., 'Multimodal Video Indexing: A Review of the State-of-the-art,' Multimedia Tools and Applications, Kluwer Academic Publishers, vol. 25, Jan. 1, 2005, pp. 5-35.

Bradley, Logan, Stadium Partners With GumGum Sports To Produce Sponsorship Valuations, SportTechie.com, dated Jul. 14, 2017, https://www.sporttechie.com/stadium-partners-gumgum-sports-produce-sponsorship-valuations/.

businesswire.com, GumGum Sports Launches; Revolutionizes Media Valuations Through Advanced Computer Vision Technology, dated Dec. 15, 2016, http://www.businesswire.com/news/home/20161215005787/en/GumGum-Sports-Launches-Revolutionizes-Media-Valuations-Advanced.

Chao, Wei-Lun, Introduction to Video Fingerprinting, Graduate Institute of Communication of Engineering, NTU, 2009.

Chestnut, Mark, How to Measure the Value of Media Coverage, Huffingtonpost.com, The Blog, dated Dec. 31, 2014, Updated on Mar. 2, 2015, https://www.huffingtonpost.com/mark-chesnut/how-to-deal-with-travel-w_2_b_6383280.html.

cnbc.com, How do you put a financial value on sports sponsorship?, Video, dated Jul. 21, 2017, https://www.cnbc.com/video/2017/07/21/how-do-you-put-a-financial-value-on-sports-sponsorship.html.

Ha, Anthony, GumGum Sports helps teams and advertisers calculate the value of sponsorships, TechCrunch, https://techcrunch.com/2016/12/15/gumgum-sports/, dated Dec. 15, 2016.

(56) References Cited

OTHER PUBLICATIONS

Hickman, Arvind, Valuation tool coming to Australia finds sports sponsorship massively undervalued, Adnews.com, dated Mar. 27, 2017, http://www.adnews.com.au/news/valuation-tool-coming-to-australia-finds-sports-sponsorship-massively-undervalued.
Lemire, Joe, GumGum Sports Launches NBA Social Media Valuation Index, SportTechie.com, dated Aug. 3, 2017, https://www.sporttechie.com/gumgum-sports-launches-nba-social-media-valuation-index/.
Melcher, Paul, Brand Logo Monitoring Leave Marketers Hungry for More, Kaptur.co, dated Oct. 20, 2015, http://kaptur.co/brand-logo-monitoring-leave-marketers-hungry-for-more/.
Minnium, Peter, The Definitive Guide To The Digital Display Ad Ecosystem, MarketlingLand.com, dated Oct. 29, 2014, https://marketingland.com/digital-simplified-new-advertising-supply-chain-104734.
Noto, Anthony, How GumGum's image-recognition tech is changing the sports industry, New York Business Journal, dated Sep. 1, 2017, https://www.bizjournals.com/newyork/news/2017/09/01/how-gumgum-image-recognition-tech-changes-sports.html.
Pinsker, Joe, Is There Room for Sports to Get Even More Commercialized?, The Atlantic, dated Jun. 13, 2016, https://www.theatlantic.com/business/archive/2016/06/future-corporate-sports-sponsorhip/486569/.
Press Release, GumGum Launches Mantii, Real-Time Image Recognition Comes to Social Media, dated Jun. 17, 2016, https://www.gumgum.com/press/gumgum-launches-mantii-real-time-image-recognition-comes-to-social-media/.
Press Release, GumGum Sports and New Sports Network Stadium Partner to Track Advertising Placements on Live Programming, PRWeb.com, dated Jul. 13, 2017, https://www.gumgum.com/press/gumgum-sports-new-sports-network-stadium-partner-track-advertising-placements-live-programming/.
prweb.com, GumGum Sports Announces "Beyond the Broadcast"—A Monthly NBA Social Media Valuation Index, dated Aug. 3, 2017, http://www.prweb.com/releases/2017/08/prweb14570074.htm.
Reim, Garrett, Some Players Find Sponsorships Score Big, Los Angeles Business Journal, dated Jan. 13, 2017, http://insights.gumgum.com/hubfs/Some%20Players%20Find%20Sponsorships%20Score%20Big.pdf.
Snyder, Charlie, Hanging With . . . GumGum Sports GM Jeff Katz Pitches New Sponsorship Service, SportsBusinessDaily.com, Published Mar. 31, 2017, http://www.sportsbusinessdaily.com/Global/Issues/2017/03/31/People-and-Pop-Culture/Hangin-With.aspx.
Vimeo, GumGum Sports: Beyond the Broadcast, uploaded Nov. 16, 2016, https://vimeo.com/191849358.
Thomas, Graham, Sports TV Applications of Computer Vision, Research & Development White Paper, British Broadcasting Corporation, dated Feb. 2012.

\* cited by examiner

$106,056,387
Full Media Value

L.A. Hawks
Team

09.20.2016 – 09.19.2017
Date Range

| By Channel | Volume | (%) | Imps (Est) | (%) | Engagements | (%) | Valuation | (%) |
|---|---|---|---|---|---|---|---|---|
| TV | 51 | 0% | 153,000,000 | 4% | N/A | N/A | $79,802,019 | 75% |
| Social | 28,392 | 95% | 3,706,178,112 | 91% | 51,957,360 | 95% | $24,133,200 | 23% |
| Streaming | 152 | 1% | 68,552,000 | 2% | 2,888,000 | 5% | $1,713,800 | 2% |
| Digital | 1,380 | 5% | 135,789,240 | 3% | 40,020 | 0% | $407,368 | 0.4% |
| Total | 29,975 | 100% | 4,063,519,352 | 100% | 54,885,380 | 100% | $106,056,387 | 100% |

| By Sponsor | Volume | (%) | Imps (Est) | (%) | Engagements | (%) | Valuation | (%) |
|---|---|---|---|---|---|---|---|---|
| Sponsor 1 | 11,690 | 39% | 1,666,042,934 | 41% | 20,856,444 | 38% | $44,543,682 | 42% |
| Sponsor 2 | 8,993 | 30% | 1,097,150,225 | 27% | 18,112,175 | 33% | $27,574,661 | 26% |
| Sponsor 3 | 3,897 | 13% | 609,527,903 | 15% | 5,488,538 | 10% | $14,847,894 | 14% |
| Sponsor 4 | 5,396 | 18% | 690,798,290 | 17% | 10,428,222 | 19% | $19,090,150 | 18% |
| Total | 29,975 | 100% | 4,063,519,352 | 100% | 54,885,380 | 100% | $106,056,387 | 100% |

| By Channel | Volume | (%) | Imps (Est) | (%) | Engagements | (%) | Valuation | (%) |
|---|---|---|---|---|---|---|---|---|
| Facebook | 9,085 | 32% | 1,297,162,339 | 35% | 19,743,797 | 38% | $8,446,620 | 35% |
| Youtube | 4,827 | 17% | 704,173,841 | 19% | 7,793,604 | 15% | $4,343,976 | 18% |
| Twitter | 7,382 | 26% | 667,112,060 | 18% | 7,793,604 | 15% | $4,585,308 | 19% |
| Instagram | 5,111 | 18% | 704,173,841 | 19% | 11,950,193 | 23% | $4,826,640 | 20% |
| Weibo | 1,987 | 7% | 333,556,030 | 9% | 4,676,162 | 9% | $1,930,656 | 8% |
| Total | 28,392 | 100% | 3,706,178,112 | 100% | 51,957,360 | 100% | $24,133,200 | 100% |

| Team or Participant | Wins | Losses | Standing | Consecutive Wins |
|---|---|---|---|---|
| Team or Participant 1 | 2 | 25 | 10 | 0 |
| Team or Participant 2 | 15 | 10 | 3 | 2 |
| Team or Participant 3 | 24 | 3 | 1 | 15 |
| Team or Participant 4 | 6 | 21 | 7 | 1 |

1202

| Record | Value |
|---|---|
| All Time Wins | 30 |
| Consecutive Wins | 17 |

1204

| Participant | Total Points for Season | Average Points per Event |
|---|---|---|
| Participant 1 | 15 | .9 |
| Participant 2 | 5 | .1 |

AUTOMATED ANALYSIS OF IMAGE OR VIDEO DATA AND SPONSOR VALUATION

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

This application claims benefit of U.S. Provisional Patent Application Ser. No. 62/397,739 entitled "Efficiently Identifying Image Objects in Video Data Using Video Fingerprinting" filed Sep. 21, 2016, U.S. Provisional Patent Application Ser. No. 62/421,886 entitled "Determining Sponsorship Value Based on Analysis of Image and Video Data" filed Nov. 14, 2016, and U.S. Provisional Patent Application Ser. No. 62/505,758 entitled "Determining Sponsorship Value Based on Analysis of Image and Video Data" filed May 12, 2017, which are hereby incorporated by reference in their entireties.

BACKGROUND

It is common for companies to sponsor sporting events or to otherwise place their advertisements within a sports arena. For example, a company may contract with a party having rights in an arena, team or league to place a banner within a stadium during game days, to place a logo on a team jersey, to have an advertisement displayed on digital signage within a stadium, etc. Sponsors and holders of rights in the advertising space often determine pricing and desirability of specific advertising space based in part on in-person audience attendance at the sporting event and a size of the television audience watching the sporting event at home. However, it is increasingly common, due in part to changes in the way that people consume content, that these attendance and television viewership numbers may significantly underestimate the number of people that actually saw at least a clip or highlight of the sporting event that contained a sponsor's logo or advertisement. For example, short video highlights are often played across many different television channels as well as shared on the Internet via social media networks, video sharing platforms and other services. These additional exposures are not typically tracked in any reliable or comprehensive manner.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein:

FIG. 5B is a portion of a sample report providing a full media value determined by the system for a given brand over a given time range that is broken down in a number of ways.

FIG. 12 illustrates historical data for use by the exchange system in time segments on the dynamic signage.

DETAILED DESCRIPTION

Figure 1:
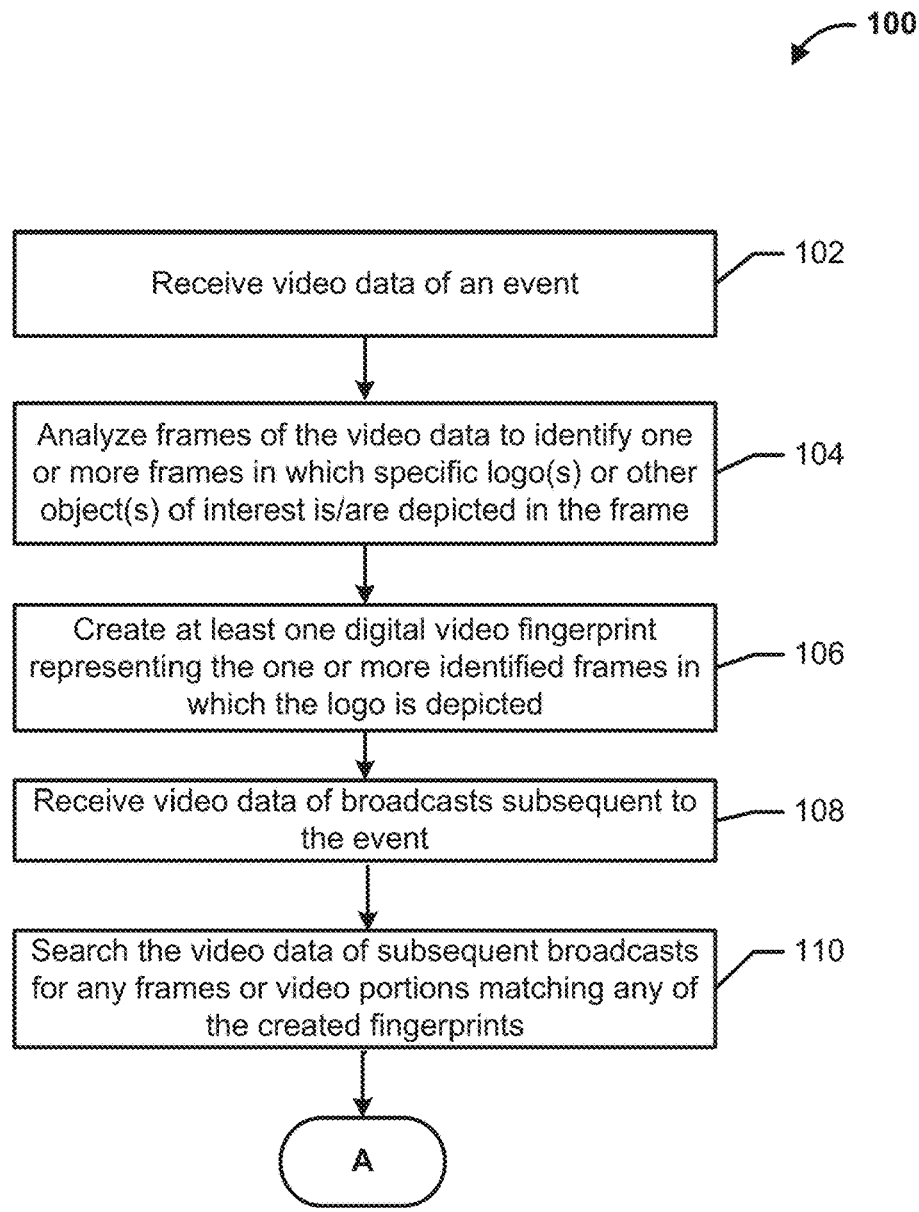
FIGS. 1 and 2 are flow diagrams of illustrative methods for determining an aggregated media value associated with a brand exposure based on video fingerprinting techniques.

Aspects of the present disclosure relate to efficiently analyzing large amounts of video data to identify portions of video where one or more logos or other image objects of interest appear, and determining an aggregated media value attributable to an underlying original source event or source video associated with the logo exposure. For example, suppose that a company sponsors a sporting event that is broadcast on television, and the company's logo or name appears onscreen (such as appearing on a sign or banner in a stadium) for various segments of the live broadcast. While this live event results in the immediate brand exposure with respect to the viewers that watch the game broadcast, there may be a number of additional viewers that see the logo or brand name during a replay or highlight of the sporting event included in the nightly news or a sports analysis program that airs on a different channel at some point hours or even days after the sporting event. The clip/highlight could also appear in social media, on a digital publisher's website, via a common streaming service, a set top box, or streamed from a website. Aspects of the present disclosure include identifying these additional brand exposure moments across potentially hundreds or thousands of channels, websites, streaming services, social media networks, and VR/AR platforms such that a more accurate media value of the event sponsorship can be determined.

Video fingerprinting is generally used to compactly represent a video or portion of a video in a manner that allows for efficient searching of other videos to identify either duplicates or slight variations of the same video. For example, computer software may identify, extract and compress characteristics of video data to create a digital file that serves as a "fingerprint" of the specific video data. The precise video characteristics analyzed vary depending on the specific implementation and technique, with many variations being well known and used. Video characteristics that may be considered in some implementations in order to generate a video fingerprint include key frame analysis, color analysis, and motion changes during a video sequence. Because video fingerprinting typically analyzes aspects of the actual video data as opposed to employing a more generic file comparison technique (such as comparing hash codes of files), fingerprinting can be used to identify perceptually similar videos where a copy of the video may be at a different resolution, cropped, blurred, had text or other content overlaid over a portion of the video, and/or been otherwise modified. A common existing use of video fingerprints is in the field of Digital Rights Management ("DRM") in order for content owners (such as film studios or publishers) to identify when files containing their copyrighted video content are uploaded to video sharing websites or other file sharing networks accessible via the Internet.

In one embodiment of the present disclosure, a computing system may analyze a live event broadcast for brand exposures (e.g., instances where a company name, logo or other visual indicator is present in a frame of broadcasted video). For each video sequence that contains a brand exposure, the system may create a digital fingerprint to identify a portion of the video in which the brand exposure occurs. The system may subsequently search video data of potentially hundreds or thousands of subsequent broadcasts across different channels, websites, streaming services, or social media networks to identify occurrences of the digital fingerprint. In this manner, when excerpts, replays, or highlights of this live event broadcast are later included in a news program, sports highlight show, or other broadcast, the system may identify these occurrences based on the fingerprint and without a more computationally expensive analysis of the video data. For instance, aspects of the present disclosure result in detection of logos from an event in large collections of video data without necessarily requiring searching image data of individual frames of each broadcast for depiction of a logo (including size relative to entire frame, duration, and/or location), and without necessarily relying on closed captioning or other inefficient and/or inaccurate searching alternatives.

In some embodiments, once a fingerprint match is identified in a subsequent broadcast, the system may record information such as the channel (or URL), program name, number of viewers, commercial cost (e.g., the cost for an advertiser to run a 30-second commercial during the program), and the time frame from the original live broadcast that is featured. This information can then be aggregated across all of the programs having fingerprint matches to determine an overall or aggregated media value of brand exposure related to the event, which may include not only the value of the live event broadcast, but also subsequent exposure during news programs, highlight programs, websites, streaming services, or social media networks. This information may then be provided to various stakeholders with the ability to view detail regarding the channels, programs, viewers, commercial values, and time frames that contributed to the full media value.

While video fingerprinting may be used to identify replays, reposts or repeat broadcasts of clips as discussed herein, other aspects of the present disclosure relate to analyzing original image or video data that has not been previously analyzed in a different form in order to identify sponsor's logos or advertisements (among other features). Accordingly, while some embodiments of the present disclosure may employ video fingerprinting, advantages provided by many aspects of the present disclosure have utility apart from any use of video fingerprinting, and video fingerprinting methods may not be implemented at all in some embodiments.

FIG. 1 is a flow diagram of an illustrative method 100 that may be implemented by a computing system, such as computing system 302 that will be described below, in order to identify broadcasts or other videos that include a logo or other image object of interest that was originally included in an earlier video. The illustrative method begins at block 102, where the computing system receives video data of an event. The event may be, for example, a live television broadcast (which may first have been stored as digital video data) of a sporting event, press conference, or political event, among others. The event may be one in which a certain company or brand paid a venue or other entity in order to place an advertisement in the event venue, such as a sign or banner in a stadium or arena. The sign or banner may include, for example, the company's name and/or logo. While television broadcasts are often used as an example herein, aspects of the present disclosure related to analyzing television broadcast data are also applicable to Internet-distributed video. For example, a broadcast network may include not only a traditional television broadcast network utilizing cable or satellite distribution, but also services that distribute over-the-top ("OTT") content via the Internet without being transmitted via cable, satellite or other traditional television content distribution mediums.

Next, at block 104, the computing system analyzes frames of the event's video data to identify the frames or video sequences within the video data in which the logo, brand name, or other advertisement content is depicted or captured in the frame. Depending on the embodiment, key frames may be determined using known methods in order to avoid analyzing every frame of the video, while still having a high likelihood that instances of a logo being visible in the video will be identified based on key frame analysis. In some embodiments, a specific company's logo may be the only logo that the system is configured to identify for a given event, while in other embodiments a potentially large library of logos (and variations of logos as they appear in the master live broadcast) may each be searched for within a given video frame. For example, one or more image classifiers may have been previously trained using hundreds or thousands of different company logos, such that the one or more classifiers can identify which, if any, of those logos appear in a given image or video frame.

Computing systems configured to perform object recognition often rely on classifiers (sometimes also referred to as "models" or "classifier models"). Classifiers are often probabilistic models that are created or generated using machine learning techniques. In the context of object recognition in digital images, classifiers may be used to determine a likelihood that a particular image object (e.g., a visual representation of an object, or a company logo) is included or depicted in an image. Various image object recognition techniques are known in the field, and the present disclosure is not specific to any one object recognition technique to identify logos or other objects. While various such techniques will be known to one of ordinary skill in the art, a brief overview is provided below. As used herein, a neural network may generally be considered to be one type of classifier, and a classifier in turn may be considered to be one type of machine learning model. As will be appreciated by one of ordinary skill in the art, while neural networks are sometimes used herein as an example classifier, other types of classifiers or classification models may be used instead unless otherwise noted in a specific embodiment. Furthermore, the term "machine learning model" is intended herein to refer to a large class of models that employ any of a variety of machine learning techniques, and is not limited to a neural network or other specific implementation approach that may be used as an example in describing specific embodiments herein.

An image object that is the subject of a classifier that has been created or trained to identify that particular image object may be referred to as a "target image object." For example, a target image object may be a visual representation of a company's logo, and a classifier may be generated specifically to identify at least that logo. In some embodiments, the target image object may generally refer to a class or group of related image objects that may be identified using a particular classifier. In the above example, the target image object may be related to any of one or more different styles or versions of the same logo of the company (e.g., logos of the company from different decades), and the classifier may be trained or created to identify one or more (or all) of those different logos. As will be described in more detail below, a given target object or class of objects may represent a combination of a logo and a real-world location or source of the logo. For example, a classifier may be trained to identify that a specific logo appeared on the padding of a football goalpost, as opposed to only identifying that the logo appeared. Accordingly, in some embodiments, the same logo may be associated with different target image objects depending on where in an arena or other venue the logo appears in a given image or video frame.

Classifiers configured to identify a target image object may be created or trained using exemplar images that are known to include that target image object. Specifically, in creating or training a model, each exemplar image is processed to identify features of the image. These features are usually some measurable property or characteristic of the target image object. Examples of types of features used in object recognition include scale-invariant feature transform (SIFT) features and speeded-up-robust features (SURF). Because the exemplar images are known to include the target image object, the features of the exemplar images are then associated with a probability of indicating that the target image object is included in the image. For example, if most or all of the exemplar images includes a certain feature, the presence of that feature in another, unclassified image may indicate a high likelihood that the unclassified image includes the target image object. Further, the absence of that feature in an unclassified image may indicate a lower likelihood that that unclassified image includes the target image object.

With further reference to block 104, in some embodiments, a previously trained image classifier may return a certain probability that a given frame of the video includes a target image object (such as a specific logo), and the system may deem those frames associated with a probability that satisfies a certain threshold likelihood (e.g., 75%) as including the target image object. On the other hand, the system may deem images associated with a probability or likelihood that does not satisfy the threshold likelihood as not including the target image object. In some embodiments in which a number of different companies' logos are searched by the system, one or more classifiers may provide a separate probability for each of the different companies and/or for each different logo. When a match is found, the computing system may determine and store various information, such as the size of the logo within the frame and where in the captured scene the logo appears (e.g., on a billboard). Based on an analysis of multiple frames that make up sequences of video, the computing system may further determine a duration (or a start and end time) during which the logo is visible in the video.

At block 106, the computing system may create a digital video fingerprint (which may be stored by the system as a digital file) representing the one or more identified frames (or video sequences, in some embodiments) in which one of the logos or other objects of interest is depicted. For example, if the system determined that a given company's logo appeared from the time ranges of 1:03-1:12 and from 2:05-2:46 in the event's video data, the computing system may create two or more video fingerprints that represent frames and/or sequences of video data in these time ranges. As discussed above, a number of techniques are known for creating a digital fingerprint representing video data, and such techniques need not be described in detail herein. In embodiments in which a number of different companies' logos were identified in the video data, the computing system may separately group fingerprints created for frames in which each company's logo appeared. For example, the computing system may generate and store one set of fingerprints for the pairing of the event and a first company, and a second set of fingerprints for the pairing of the event and the second company.

Next, at block 108, the computing system may receive or retrieve video data of broadcasts subsequent to the event. The video data, in some embodiments, may be recorded broadcasts of television programming that aired for some time range subsequent to the event, such as for a day or week following the event. In some embodiments, the computing system may receive or retrieve the video data from a data source that digitally records all programming that airs on each of a number of different channels, such as a service that operates a large number of digital video recorders (DVRs) tuned to record different channels from one or more satellite broadcast feeds. In some embodiments, only programs and/or channels that have been previously determined to be likely to include portions of the event video may be retrieved. For example, according to some embodiments, if the event is a sporting event, the programs retrieved may be limited to programming from sports channels, sports shows, and nightly news programs, which may each be likely sources of sports highlights or video clips. In other embodiments, substantially all programming broadcast in a given region and/or nationwide may be analyzed, potentially in an order of priority such that programs or channels more likely to include portions of the event video are retrieved and analyzed first.

In some embodiments, video data other than television broadcasts may additionally or alternatively be retrieved at block 108. For example, video data uploaded to or otherwise accessible from social media services, file sharing services, and/or computer network-based video services (which each may be accessed via websites and/or dedicated applications) may be retrieved and analyzed. In such embodiments, the computing system may be configured to determine whether video clips or highlights from the event appear in social media or Internet-accessible video, among other sources. Additionally, images (in addition to or instead of video) uploaded to social media websites or other Internet sources may be analyzed and considered when determining an aggregated media value, as will be described in more detail below. For example, the estimated reach and engagement level for a given post, video, or photo on social media may be taken into account in determining a media value associated with the post, video, or photo.

At block 110, the computing system searches the subsequent video data for fingerprint matches with respect to the previously generated video fingerprints that correspond to portions of the original video that include a logo or other object of interest. As will be appreciated, block 108 and 110 may be repeated for various subsequent videos (e.g., as each individual television program is retrieved at block 108, it may be searched at block 110), rather than all subsequent programs searched at a single time. Known techniques may be used (including key frame determinations) to efficiently determine whether a given fingerprint is a match with any portion of the subsequent video. As discussed above, a fingerprint match may indicate perceptually similar videos where the subsequent video may be at a different resolution, cropped, blurred, had text or other content overlaid over a portion of the video, and/or been otherwise modified. In some embodiments, the confidence level of a fingerprint match may be increased by subsequently performing image analysis on a frame of the video to detect the original logo or other object of interest (similar to the process discussed above with respect to analyzing the original video). Such additional analysis may be useful in instances where the original video may have been modified before being included in the subsequent broadcast. For example, the system may determine confidence levels based on how many pixels the original video portion and subsequent video portion have in common (or pixels that are substantially the same, accounting for slight variations), then based on this confidence level may perform image recognition to verify that a similar video frame is in fact a positive match. Once one or more fingerprint matches are determined, the illustrative method may proceed to the blocks described below with respect to FIG. 2.

Figure 2:
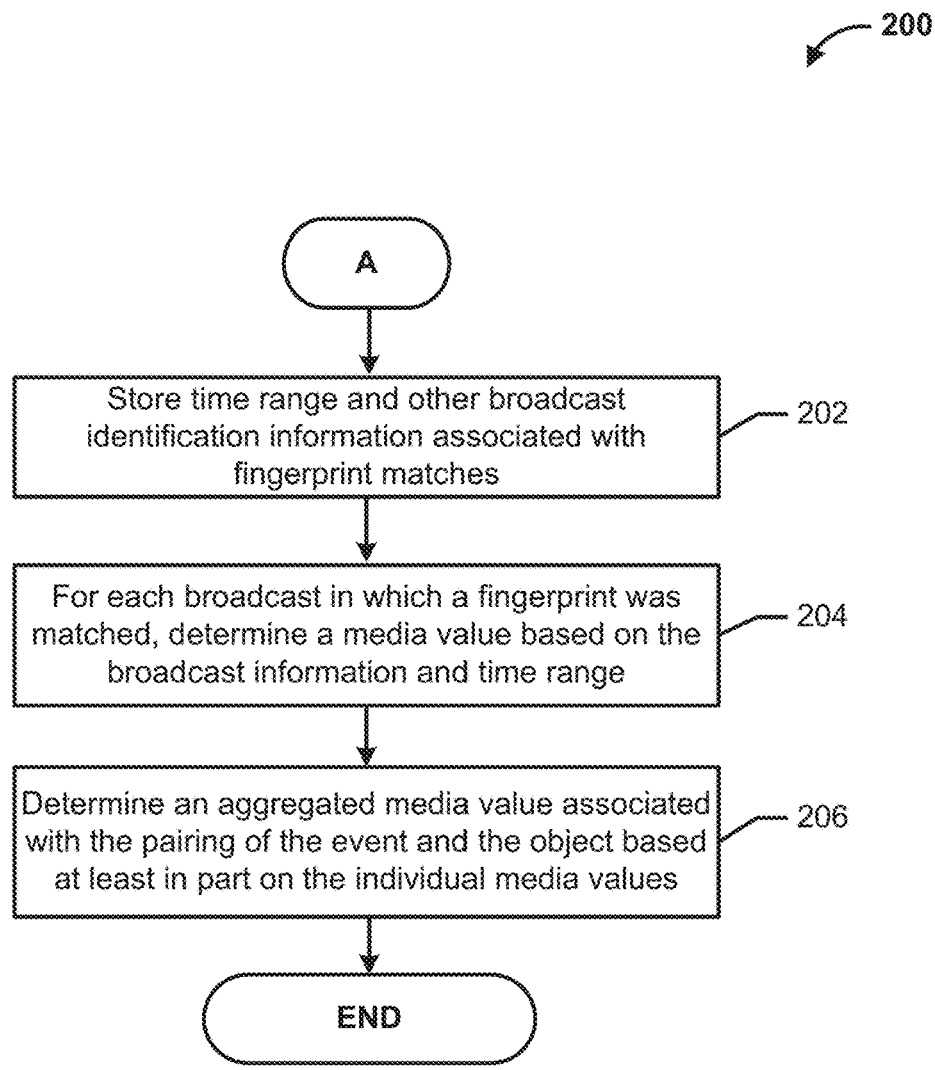

FIG. 2 is a flow diagram of an illustrative method 200 that may be implemented by a computing system, such as system 302 that will be described below, in order to determine an aggregate media value associated with an event's brand exposure based in part on video fingerprint matching. While FIG. 2 will be described with respect to fingerprint matching, not all embodiments of the present disclosure utilize fingerprint matching or video fingerprints generally, and the descriptions of fingerprint matching herein are not intended to be limiting. For example, in some embodiments, other computer vision techniques and machine learning methods may be utilized instead of or in addition to fingerprint matching in association with determining aggregate media value, as will be described further below.

The illustrative method 200 begins at block 202, which may be implemented following block 110 discussed above with reference to FIG. 1. At block 202, the computing system may store time range and other broadcast information associated with one or more fingerprint matches that were previously determined at block 110 described above. For example, the system may store, in one embodiment, an indication of the channel, program name, number of viewers, 30-second commercial cost, and the time frame(s) in the original event video that appeared in the subsequent video (e.g., "QXTW; Sports Rundown; 290,000; $32,100; 23:12-23:23; 24:15-24:25"). The viewership numbers and cost for a commercial airing during the program may be determined from third-party data sources, which may be associated with advertising companies, industry publications, and/or channel operators themselves. The system may determine a 30-second commercial cost based on how many viewers were watching the program during a particular minute or second (instead of for a whole program) in embodiments in which more granular viewership data is available. In embodiments in which Internet-viewable videos are analyzed, the number of users that have viewed a video may be extracted from a webpage in which the video is embedded. In some embodiments, the computing system may additionally store information regarding which logo or other object of interest was identified, and may store the data in a manner (such as relational database) by which the system may easily group all appearances of a given logo from a given event in each of a number of subsequent broadcasts.

At block 204, the computing system determines, for each broadcast in which at least one fingerprint was matched, a media value associated with the exposure of the logo on that broadcast. In some embodiments, the media value may be based at least in part on the actual cost that would have been incurred by the company owning the logo had that company paid for a commercial during the given television program. In other embodiments, the media value may be estimated based on the number of viewers of the program, the time slot and channel that the program was broadcast, viewer demographic data, and/or other factors. In some embodiments, any appearance of a certain company's logo on a broadcast, even if only during a short five second highlight clip, may be considered to be worth the cost of the shortest commercial slot during that program. In other embodiments, the computing system may discount or otherwise determine the media value to be less than the cost of a commercial based on factors such as the length of time that the logo is onscreen during the program and/or the prominence of the logo within the program while it is visible (e.g., the percentage of space that the logo occupies in a frame of the video).

Lastly, at block 206, the computing system may determine an aggregated media value associated with each pairing of an event and a logo (or other object of interest) based at least in part on the individual program-specific (or video-specific) media values determined at block 204. For example, an aggregated media value in one instance may represent the marketing value that a company obtained overall for placing an in-venue advertisement at a sporting arena for a given game or other event. This total value may represent or capture not only the value for the exposure gained during a live broadcast of the game, but also subsequent value obtained through later exposure when the company's in-venue advertisement can be seen in a highlight of the game that appears on other television programs, social media posts, user-generated videos, and/or other sources. In some embodiments, the aggregated value may be a sum of the various media values determined for a given paring of an event and a logo, plus the media value for the initial live broadcast of the event.

Once an aggregated media value for a given brand exposure has been determined, the computing system may provide this value to one or more third parties, such as via a secure webpage, an application programming interface (API), an email, a printed report, a mobile application, and/or other method or medium. The recipient may include a rights holder with respect to the advertising space at the event (e.g., an arena or a sports team), a sponsor or rights holder in the logo (e.g., the company that paid for the original in-venue advertisement), and/or an auditor or other service provider that works with marketers, advertisers, venues, or a specific industry associated with the advertisement. The information may be provided in an interactive manner, such that the recipient may select from various level of detail or aggregation, and may filter or search by channel, program, time slots, etc. in order to see specific data (such as that determined and stored at blocks 202 and 204 described above).

Figure 3:
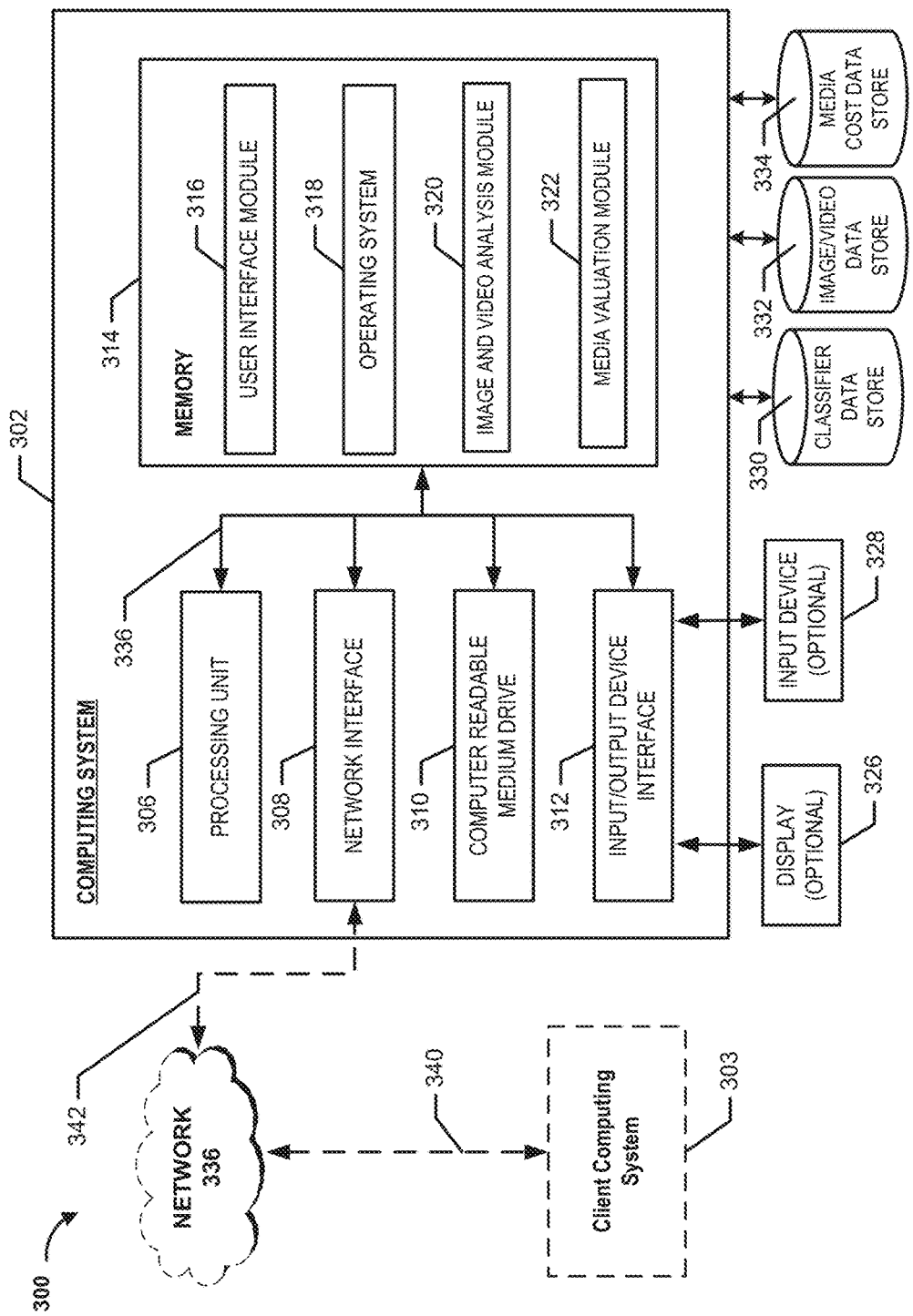
FIG. 3 is a system block diagram of a computing environment suitable for use in various embodiments of the present disclosure.

FIG. 3 illustrates a general architecture of a computing environment 300, according to some embodiments. As depicted in FIG. 3, the computing environment 300 may include a computing system 302. The general architecture of the computing system 302 may include an arrangement of computer hardware and software components used to implement aspects of the present disclosure. The computing system 302 may include many more (or fewer) elements than those shown in FIG. 3. It is not necessary, however, that all of these generally conventional elements be shown in order to provide an enabling disclosure.

As illustrated, the computing system 302 includes a processing unit 306, a network interface 308, a computer readable medium drive 310, an input/output device interface 312, an optional display 326, and an optional input device 328, all of which may communicate with one another by way of a communication bus 336. The processing unit 306 may communicate to and from memory 314 and may provide output information for the optional display 326 via the input/output device interface 312. The input/output device interface 312 may also accept input from the optional input device 328, such as a keyboard, mouse, digital pen, microphone, touch screen, gesture recognition system, voice recognition system, or other input device known in the art.

The memory 314 may contain computer program instructions (grouped as modules or components in some embodiments) that the processing unit 306 may execute in order to implement one or more embodiments described herein. The memory 314 may generally include RAM, ROM and/or other persistent, auxiliary or non-transitory computer-readable media. The memory 314 may store an operating system 318 that provides computer program instructions for use by the processing unit 306 in the general administration and operation of the computing system 302. The memory 314 may further include computer program instructions and other information for implementing aspects of the present disclosure. For example, in one embodiment, the memory 314 may include a user interface module 316 that generates user interfaces (and/or instructions therefor) for display upon a computing system, e.g., via a navigation interface such as a browser or application installed on the computing system.

In some embodiments, the memory 314 may include a video analysis module 320, which may be executed by the processing unit 306 to perform operations according to various embodiments described herein (e.g., the operations described with reference to FIG. 1 above). The memory 314 may further include a media valuation module 322, which may be executed by the processing unit 306 to perform other operations according to various embodiments described herein (e.g., the operations described with reference to FIG. 2 above). The modules 320 and/or 322 may access the data stores 330, 332 and/or 334 in order to retrieve data described above and/or store data. Each of these data stores may be part of the computing system 302, remote from the computing system 302, and/or may be a network-based service. The classifier data store 330 may store trained models and data used for the classification of video frames or images to identify image objects appearing within the images. The video data store 332 may store digital video data, such as that recorded to a DVR, of various television broadcasts and/or other video files. The media cost data store 334 may store information regarding the cost of commercials during various television programs or time slots, viewer demographic data, and/or other data used to determine media values.

In some embodiments, the network interface 308 may provide connectivity to one or more networks or computing systems, and the processing unit 306 may receive information and instructions from other computing systems or services via one or more networks. In the example illustrated in FIG. 3, the network interface 308 may be in communication with a client computing system 303 via the network 336, such as the Internet. In particular, the computing system 302 may establish a communication link 342 with a network 336 (e.g., using known protocols) in order to send communications to the computing system 303 over the network 336. Similarly, the computing system 303 may send communications to the computing system 302 over the network 336 via a wired or wireless communication link 340.

Those skilled in the art will recognize that the computing systems 302 and 303 may be any of a number of computing systems including, but not limited to, a laptop, a personal computer, a personal digital assistant (PDA), a hybrid PDA/mobile phone, a mobile phone, a smartphone, a wearable computing device, an electronic book reader, a digital media player, a tablet computer, a gaming console or controller, a kiosk, an augmented reality device, another wireless device, a set-top or other television box, one or more servers, and the like.

Additional Features for Determining Sponsorship Value from Social Media

As discussed above, in some embodiments, a media sponsorship value may be determined that includes consideration of the aggregated media value of images and/or video on social media that are determined to include depiction of a sponsored object (e.g., a company logo). In some embodiments, the value determined may represent a media cost equivalent, which may be the amount of money that a company would have had to spend to purchase advertising space within the given social network or other location in which the image containing the company logo is posted by a user (or is otherwise added to the social media network in a manner other than a paid advertisement).

Figure 4:
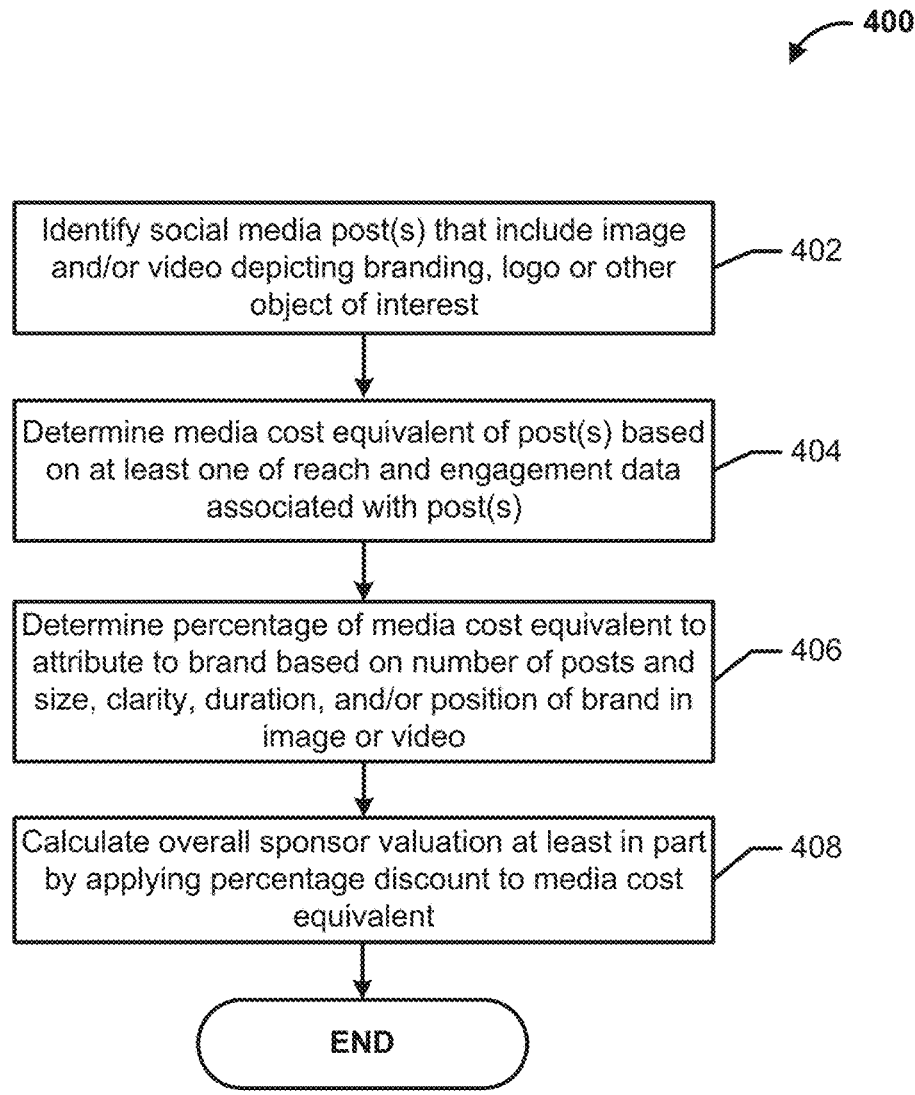
FIG. 4 is a flow diagram of an illustrative method for determining an overall sponsor valuation based on images and/or video appearing in social media posts.

FIG. 4 is a flow diagram of an illustrative method 400 that may be implemented by a computing system, such as system 302, for determining an overall sponsor valuation based on images and/or video appearing in social media posts. At block 402, the system may identify one or more social media posts that included an imbedded or linked image or video in which an object of interest appears, such as company branding, a logo, or other sponsored content. The image or video may be identified to include the object of interest based on the various methods described above.

Next, at block 404, the system may determine a media cost equivalent of the one or more identified posts based on reach and/or engagement data associated with the posts, which may be accessible via the social media service or other provider of the service through which the post was published. As one example with respect to television or other video content in which advertisements can be purchased, the cost to purchase a 30 second advertisement may be multiplied by the amount of time that the brand was displayed in the video, and further adjusted based on actual viewership numbers when available. In situations in which actual viewership numbers or "reach" data is available (such as on a video sharing website in which the number of page views or video views is listed on a webpage or is otherwise available), the number of views that an image or video receives may be considered in the sponsorship value determination. Additionally or alternatively, user engagement may be considered (such as the number of users who selected a link or URL associated with an image or video posted to a social network or other location).

For example, a media cost equivalent may be determined, in some embodiments, based on a blend of CPEE (Cost-Per-Engagement-Equivalent) and CPME (Cost-Per-Thousand-Equivalent) if a given sponsor were to purchase the media exposure that was instead gained through other means (such as users posting media to social networks). Depending on the embodiment and the available data, an average CPME for the network as a whole may be used (e.g., the average CPME for advertisements on a specific social network), or more granular CPME data based on keywords may be used. For example, the CPME may be targeted for specific populations, such as sport enthusiasts or enthusiasts for specific sports, instead of a general population. For posts that do not have exact reach metrics or viewership data, a greater weight may be applied to engagement numbers. Some social media networks may provide actual reach data (e.g., data regarding the number of users who in fact viewed a post) to the public, while others may provide this information only to the owner of the account that posted the media. Accordingly, in some embodiments, accounts that are owned by the sponsor or its affiliate (which may be referred to herein as a sponsor "owned and operated" account) may have actual reach data available, whereas similar media from the same event that is posted by a third party may not have actual reach data available. In one example, a formula may be applied as follows:

$$\text{Media cost equivalent} = ([\text{Engagements}*\text{CPEE}]*w_1) + ([\text{Reach}*\text{CPME}]*s_2).$$

In applying the above formula for a non-owned and operated account or where actual reach data is otherwise not available or not reliable, the weighting $w_1$ with respect to engagement may be set relatively high (such as 90% or 0.9), while the weighting $w_2$ with respect to reach may be set relatively low (such as 10% or 0.1). For example, a sponsor may be most interested in the number of users who actually saw the brand depicted in the media, but the system may need to estimate this number based on "likes," responses, click-through numbers, or other engagement numbers as a proxy when view numbers are not available or not reliable. As described herein, the percentage or total media values attributable to different sets or types of accounts may be determined and displayed to a user. For example, a first value may be determined for "owned and operated" accounts, and another for non-"owned and operated" accounts. For example, a sponsor may be interested to know that organic social media sharing of a video clip accounted for a certain percentage or dollar value of the total media cost equivalent, as opposed to views of social media that the sponsor itself posted for viewing by users already following or subscribing to the brand owner's social media account(s).

A variation of the above media cost equivalent formula for a video hosted on a video sharing service may be, for example:

$$\text{Media cost equivalent} = (\text{Views} * [\text{Network Cost-per-View}] * [\text{Reach Weight}] * [\text{30-second cost equivalent}]) + (\text{Engagement} * [\text{Network Cost-per-Engagement}] * [\text{Engagement Weight}]).$$

In some embodiments, the system may provide indicators of audience overlap in a report or user interface. The system may determine audience overlap as determined by users that engaged with owned posts in comparison with users that engaged with non-owned posts related to a specific rights holder. For example, overlap of users that engaged with owned posts and non-owned posts may range from zero to nine percent of the total number of users that engaged with either owned posts or non-owned posts. Thus, rights holders are demonstrating audience extension, such as social media amplification, to partners by capturing the value created from non-team owned accounts. In some systems, the average overlap of sub-categories with team-owned accounts can provide useful insights to sponsors or rights holders. For example, for a sport, such as basketball, some team accounts have greater overlap with fan accounts and official league accounts than with general sports highlight accounts. As additional examples according to research in association with certain embodiments: overlap of users that engaged with owned posts and fan accounts (such as team specific fan accounts) may correspond to five percent of the total number of engagement users; overlap of users that engaged with owned posts and official league accounts may correspond to seven percent of the total number of engagement users; and overlap of users that engaged with owned posts and general sports accounts may correspond to three percent of the total number of engagement users.

Once a media cost equivalent is determined for a given instance (such as for a post on a social media network), the percentage of this total media cost equivalent to attribute to a given brand or sponsor may be determined at block 406. In some embodiments, the percentage to apply to the total media cost equivalent may generally correlate with how prominent the branding is in the image, video or other media. This percent attribution (which may be referred to as a "stick score," according to one embodiment) for a given photo or video may be based on various factors, such as size, clarity, duration, number of appearances, number of other logos, and position of the sponsor branding/logo in relation to the full image or video. Once the percentage attribution is determined, the overall sponsor valuation may be determined at block 408. For example, if the media cost equivalent at block 404 is determined to be $10,000, and the percentage to attribute to the given brand is determined at block 406 to be 50%, the overall sponsor valuation for the given brand may be determined to be $5,000 at block 408 (i.e., $10,000 multiplied by a 0.5 discount off the full value).

In some embodiments, the system may generate various spreadsheets, summary views, dashboards, reports, user interfaces and/or other output intended for consumption by a sponsor or other user. The data in one embodiment may include, for each of a number of different URLs, videos, images or social media posts: an indication whether the account is owned and operated by the brand; a posting date; the brand name associated with the logo or other branding identified in the media; a "brand source" indicated the real world location or item on which the brand was depicted in the media (e.g., "logo on the hardwood floor of arena," or "promotional bobblehead giveaway"); duration of video; 30 second cost equivalent; social media platform or source; number of views; number of engagements; the full media value; the "media value percentage score" or prominence of the branding, to be applied as a percentage of the full media value; the adjusted media value based on media value percentage score; and/or the channel or account.

In some embodiments in which the system analyzes image and video to identify depiction of a specific physical item on which branding appears, the system may provide suggestions to the brand owner or sponsor regarding placement of its branding or logo on such items. For example, consider a situation in which a company sponsors a promotion at a baseball game in which a bobblehead doll is given to fans in attendance, and the bobblehead includes a logo of the company. When the system tracks social media sharing of images and videos that fans create depicting the doll, the system may determine in each video and image that includes the doll whether the company logo is visible, effectively determining both whether the doll is identified and whether the logo is identified. The system may then provide suggestions to the sponsor, such as "Your logo is too low on the doll because it is out of frame or otherwise not viewable in 35% of social media posts that include at least a portion of the doll in an image or video."

In some embodiments, when the system determines a valuation for a particular video with respect to a particular brand that appears in the video, a decay factor, burn out, or other diminishing factor may be applied during the time period in which the brand appears in the video. For example, if a given brand appears in a 15 minute video for a total of 5 minutes, the first minute of exposure may be worth more than the second minute, which in turn may be worth more than the third minute.

In some embodiments, the system applies a media value percentage methodology. The methodology can compare a brand exposures' quality relative to a fully branded exposure based on one or more factors to determine a percentage of the full media cost equivalent to attribute to a given brand exposure. Accordingly, the media value percentage may represent the percentage of the full media cost equivalent to attribute to a given brand exposure. The media value percentage can be based on factors including clarity, prominence, visibility, size, placement, and share of voice. The clarity factor may correspond to the clarity of the sponsor's exposure (such as how clearly visible, in-focus and/or legible a sponsor logo appears). The prominence factor may correspond to prominence of a sponsor's logo in the context of the media item. In some embodiments, a sponsor's logo that is digitally overlaid on the image or video (only someone watching the video or looking at a photo would see it) may receive a higher prominence weight than a sponsor's logo that is physically present at the sporting logo (e.g., someone physically at the sporting event would see it). In other embodiments, a sponsor logo that is physically present may receive a higher prominence than a digital overlay since there are additional people physically at the sporting event that would see the logo. The visibility factor may correspond to the percentage of exposure in a media item. The size factor may correspond to the size of a logo relative to the frame of the media item, such as the entire frame of the media item. The placement factor may correspond to the position of the logo. The share of voice factor may correspond to a quantity of signage locations that are in view. For example, a quantity of other sponsor objects can be determined in the image or video. Thus, a single logo in an image or video may receive a higher media value percentage than an image or video with many other logos also present in the image or video. In other embodiments, fewer or additional factors may be considered by the computing system when determining the media value percentages for a logo.

Figure 5A:
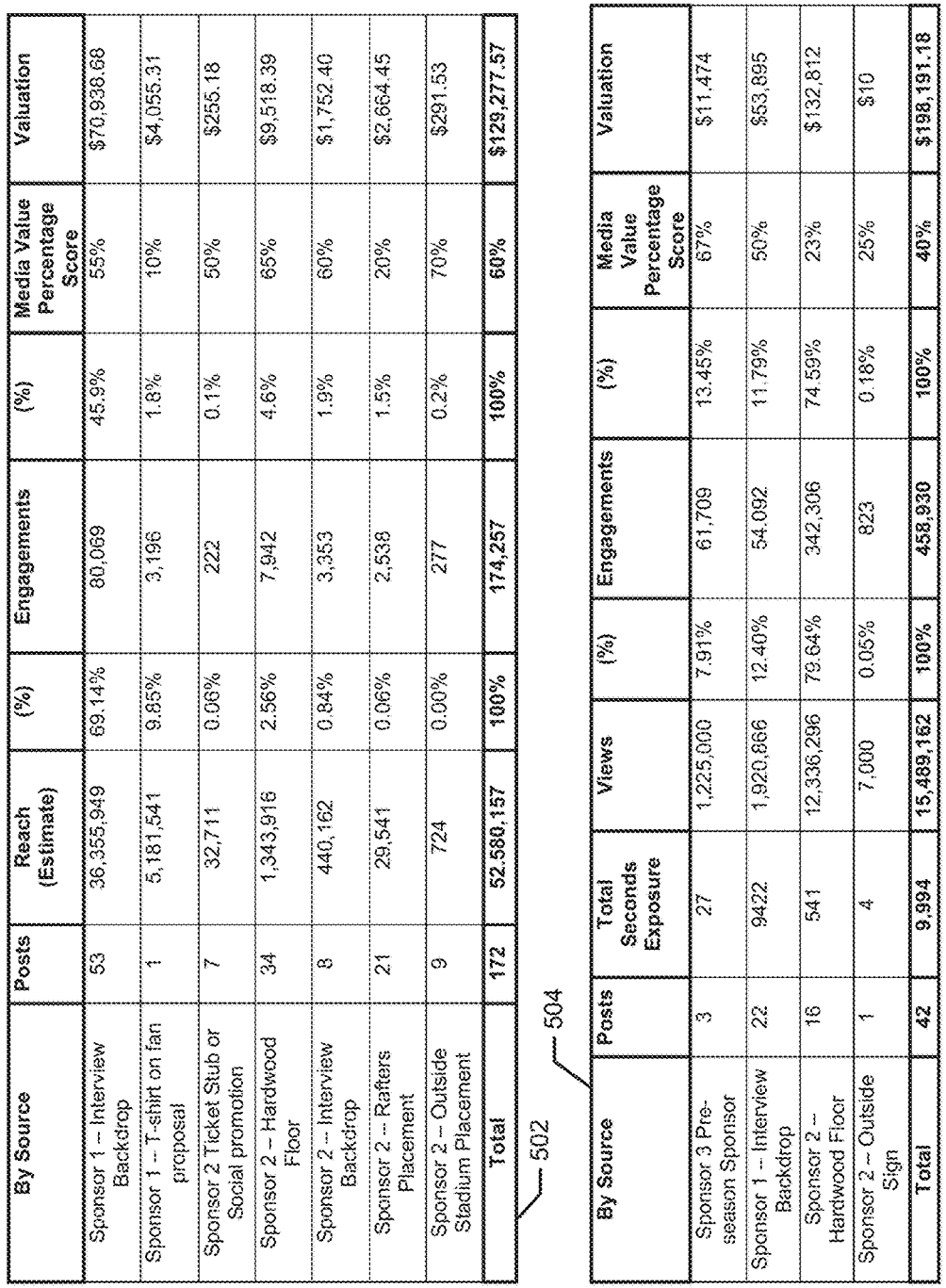
FIG. 5A illustrates sample media analysis data that may be determined and/or stored in accordance with aspects of the present disclosure.

FIG. 5A illustrates sample media analysis data that may be determined and/or stored by the computing system 302 in accordance with aspects of the present disclosure. As illustrated, table 502 includes, for each of a number of objects (identified by a combination of the sponsor and the location/source), the number of social media posts that the object appeared in, the estimated reach of number of people that viewed the object in the relevant media, the number of users who engaged with the content (e.g., selected a link to view more information, reposted the media, commented on the media, etc., which may be estimated), the "media value percentage score" as discussed elsewhere herein, and a total media valuation.

As illustrated, the objects in each row of table 502 are not simply a specific sponsor or logo, but indicate a specific real-world location or source of the identified sponsorship. For example, Sponsor 2 has placed a logo or other advertisement on at least the ticket stubs, hardwood floor, interview backdrop, and rafters. Each of these branding and source combinations may have been separately identified and analyzed by the computing system using various methods described herein. Table 504 includes similar data with respect to video content, which also includes an indication of the total seconds of exposure across viewers as well as the number of views.

As shown in FIG. 5B, the full media value determined by the system for a given brand over a given time range may be broken down in a number of ways. As illustrated, the full media value is shown grouped alternatively by channel (e.g., television, social media, streaming video, digital media), by sponsor, and by network provider (e.g., specific social networks, video hosting services, or other services that enable posting of messages, videos or photos). Other options for breaking down the valuations, in some embodiments, may include listing the portions of the valuation attributable to specific accounts, such as general sports topic accounts, league accounts, team accounts, or player accounts (not illustrated).

In some embodiments, in addition to analyzing the content of social media posts themselves, the system may follow URL links included in the posts to assess sponsor value of the linked page or file. For example, the system may use a number of methodologies to estimate the amount of traffic and/or engagement associated with the linked web page or other linked content. A media value determined for the linked page or other content (which may be based at least in part on keyword analysis and/or analysis of images and videos imbedded within the page) may then be included by the system in the total media value determinations discussed herein.

The system may, in some embodiments, create and/or access a data store that includes information categorizing each of a number of social networks and/or specific social network accounts by various tags and categories. For example, the categorization may include general topics (such as "Sports") all the way down to a more granular level, such as league, team, player, member of press, sponsor owned and operated, etc. For example, a given social network account owned by a given professional athlete may be associated with or tagged as the specific sport, the specific team, the specific player, etc. These categories or tags may then operate as filters or criteria when generating segmented reports of media valuation by category or tag. The system may create the information in this database in an automated matter, such as by identifying keywords in the account's title or name, the summary of the account (which may be a heading, tagline, introductory paragraph, "about me" section, etc.), and the content of posts, and/or based on automated analysis of media posted or linked to by the account.

Features implemented by the system, in some embodiments, may include support for dynamic sponsorship pricing. The system may, for example, include price benchmarking services in order to provide valuations to both sides of the sponsorship market (e.g., both sponsors and rights holders), including assisting in setting sponsorship prices at the level of an arena, team, league or other level. The system may provide a programmatic sponsorship marketplace that utilizes real time bidding to set sponsorship prices.

As stadiums develop more dynamic advertisement methods with respect to their signage within the stadium, more real time bidding for advertisement space will become viable. For example, a given stadium may have potentially dozens of different sponsor and location combinations (e.g., "Company A advertised on tunnel," "Company B advertised on shot clock," "Company C advertised on hardwood floor," etc.). Some of these spaces may be static physical advertisements, while others are rotational signs (changing advertisements displayed at set intervals) and others are spaces for digital insertion of an advertisement during television broadcast (e.g., a green screen, existing signage that could have sponsor data overlaid onto it, or any other physical object depicted in an image or video). In some embodiments, the system may enable sponsors to bid on inventory across any selection of teams or leagues in real time.

For example, the computing system may provide a real time bidding platform for use by teams, leagues and/or other rights holders to connect their dynamic signage to a central bidding platform. The system may provide a number of private marketplaces where a list of approved bidders (e.g. specific designated companies interested in placing advertisements on digital signage or other dynamic signage) can bid on inventory in near-real time on a cost per 30 second basis (or otherwise time based). This bidding platform may contain data feeds from a number of different games and have triggers that bidders can setup so a bid is automatically placed on their behalf in the system when certain conditions are met. For example, by selecting various selectable options in a user interface, the sponsor could set up rules in the system such as "Raise my bid by [$x] (or place a bid) if a game is in the last 2 minutes of the 4th quarter and the score is either tied or within 3 points." Other examples would include a sponsor selecting to raise or place a bid (with a corresponding dollar amount) when an individual player is about to break a record, when a team ranked in the top five teams in a league is playing another top five team, etc. Accordingly, as a digital sign in a stadium updates which advertisement is shown (such as every 30 seconds), the displayed advertisement may be dynamically selected as the advertisement of the highest bidder at that moment according to the real time bidding platform.

The system may track advertisement performance in real time to determine pacing. For example, the system may collect actual cost data from sponsors and/or rights holders and be able to demonstrate how a campaign is pacing, whether it is on track to over or under deliver relative to what a sponsor paid, and/or other real time or near-real time information throughout a sponsorship campaign.

In some embodiments, for each instance of brand exposure that the system identifies in media captured in association with sponsorship at a game, the system may determine information such as the following. The system may also look for trends and anomalies in this and other data, and/or how each data point affects media value.

What time/quarter of the game did it take place?
Was that day a Home, Away, or no game day?
Were there any major events that day?
Did the game have a close score or high score differential?
Was it in action or out of action?

The system may, in some embodiments, provide analysis taking into account the differences between home and away games. For example, for each home game, the system may determine the media value generated by the opposing team relative to the home team. Opposing team media value may be based at least in part on a local regional broadcast and the social media accounts associated with the opposing team (and potentially its fans).

Figure 6:
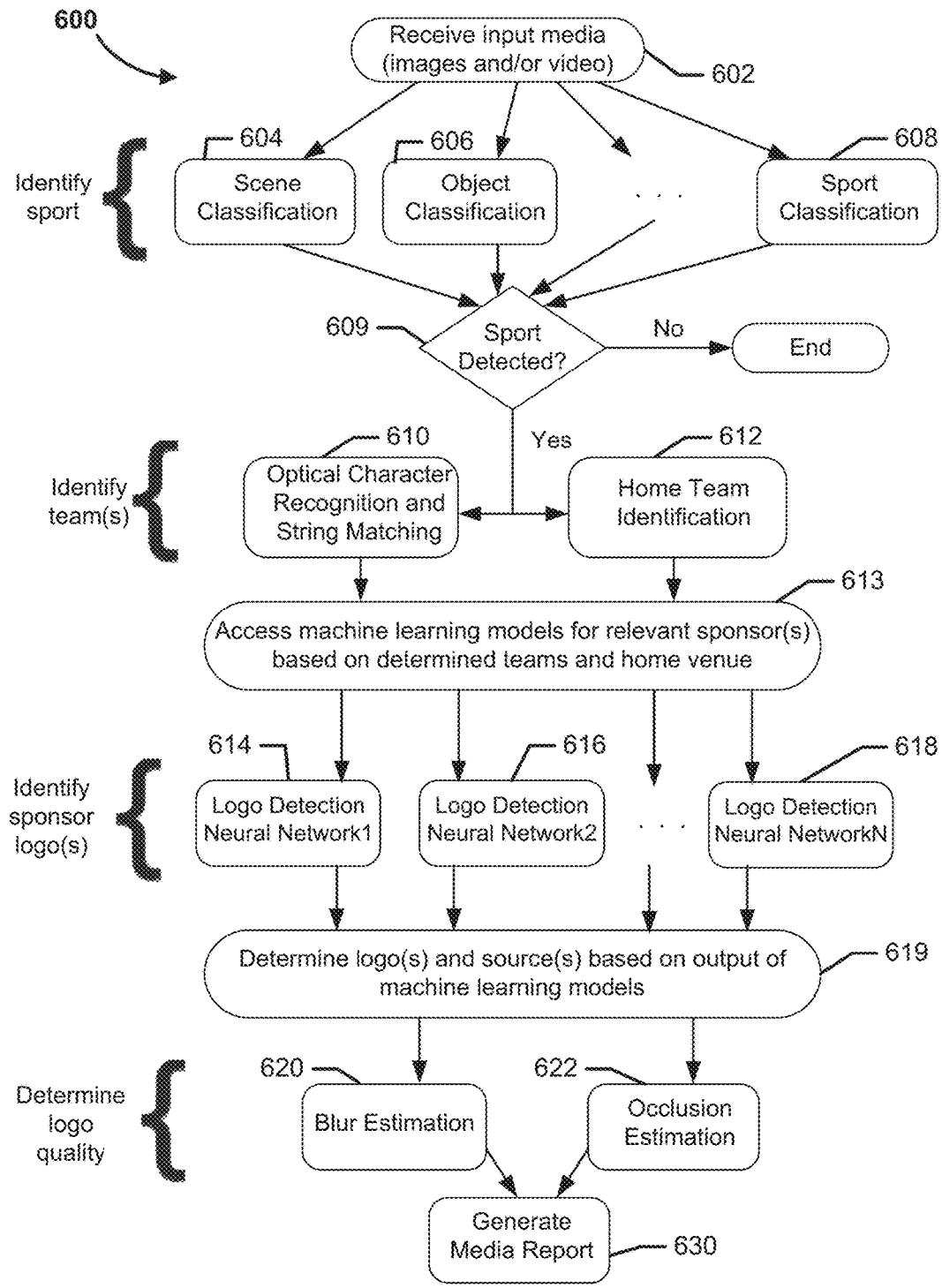
FIG. 6 is a flow diagram of an illustrative method for analyzing image or video data to determine the sport, team name, home or away game status, and sponsor information associated with an underlying game event captured in the image or video.

FIG. 6 is a flow diagram of an illustrative method 600 for analyzing image or video data to determine the sport, team name, home or away game status, and sponsor information associated with an underlying game event captured in the image or video. Illustrative method 600 may be implemented by a computing system, such as computing system 302 described above. The method 600 begins at block 602, where input media is received by the computing system. The input media may be, depending on the embodiment, image data, video data, or other content that includes image or video data referenced in or embedded within the content. For example, the input data may include a social media post retrieved via a social media network or social media service (where a post may include an embedded or linked photo or video, as well as text or other content). The input data could alternatively be video data from a broadcast source, such as a streaming video source or digitally recorded broadcast video from a satellite or cable television source. For each item of input media received or retrieved (e.g., each image or each video), the illustrative method may proceed to the blocks described below. Thus, while the illustrative method 600 will be described below with respect to a single pass through the illustrated blocks with respect to a single item of image or video content, it will be appreciated that the method may be repeated for many different items of input media. Additionally. as will be appreciated by a person having ordinary knowledge of the use of classification models, pre-processing of the input media may occur before providing associated input to the given classification models. For example, frames of an input video at a given sample rate may be extracted, and features may be determined for each image or video in order to provide the given features as input to the appropriate classification model described below.

Blocks 604, 606 and 608 may collectively be considered the sport identification blocks of FIG. 6. While the sport identification blocks illustrated in FIG. 6 include scene classification, object classification, and sport classification, it will be appreciated that more or fewer blocks may be included in association with sport identification in other embodiments. At scene classification block 604, the computing system may provide the input media as input to neural networks or other classification models that have been trained to identify a number of different scenes. Each scene or scene type may be considered to be a class for purposes of the classification models. Providing the input media as input to the scene classification models may collectively result in an indication of a confidence level with respect to each of the various predefined scenes, where the confidence level for a given scene indicates the model's confidence that the given scene is depicted in the input media (such as the input image or video). Example scenes may be, in one embodiment, a stadium with a baseball field, a domed football arena, a soccer stadium, a swimming pool and stands, etc. In some embodiments, the models may be configured to identify a predefined number of different scenes, and those scenes may be grouped into subsets that are associated with a given sport. Accordingly, for each sport that the computing system is configured to identify, there may be one or more associated scenes identified in a data store, where each scene may have an associated classifier or classification model that may be used to determine whether the given scene is depicted in specific input media.

At block 606, the computing system may pass the input media to classification models that are configured to identify specific objects depicted in image or video data. The objects for the purposes of block 606 (without limiting the meaning of "object" elsewhere in the present disclosure, such as in the context of identifying logo objects) may be various real-world objects that are used in any of a number of different sports. Example objects may include a basketball, a football, a basketball stanchion, football goalposts, a soccer goal, a hockey goal, a tennis net, etc. As discussed above with respect to the scene classification models, object classifiers or classification models may be trained to determine a confidence level regarding whether each of the objects is depicted in given input media, and each sport have be associated with one or more objects that tend to appear in image or video of the given sport. Thus, if the classification models determine a high confidence that a given input video depicts a football object and a football goalpost object within the video, the computing system may be configured to identify that both of these objects are associated with the sport of football. This may in turn indicate that there is a high likelihood (based at least on the object classification results) that the input video is footage of a football game, particularly if objects associated with sports other than football have low (or zero) confidence levels.

At block 608, the computing system may provide the input media to sports classification models that have each been trained with image and/or video data from the individual sports that the computing system is configured to identify in input media. For example, a neural network trained to generally identify basketball footage may have been trained using video from a number of different basketball games. Such a model may not have a high accuracy level on its own when applied independently of other aspects of the present disclosure. For example, it may not correctly identify a basketball game highlight video with an uncommon camera angle as relating to basketball if the training video data was largely from a small number of standard camera angles used in television broadcasts of basketball games. However, the sport classification models applied at block 608 may have useful output when that output is considered by the computing system in combination with scene classification and object classification determinations at blocks 604 and 606.

The models applied at sports identification blocks 604, 606 and 608 may be combined in various ways by the computing system in order for the computing system to determine whether the given input media depicts a sport, and if so, which sport is depicted. For example, a voting system may be used, where the confidence levels for each sport output at blocks 604, 606 and 608 are each weighted according to the predefined weights. The weights assigned to the output of scene classification block 604, object classification block 606 and sport classification block 608, in some embodiments, may generally represent or correlate with the reliability of each model in correctly classifying media as depicting a sport in previous trials. In one embodiment, each of blocks 604, 606 and 608 may have its confidence level multiplied by a weight assigned to that particular classification method, and these weighted confidence levels for each sport may then be added together to create a weighted overall confidence level for each sport. If one of the sports has a weighted overall confidence level above a predefined threshold, the computing system may determine that the given input media depicts the corresponding sport at decision block 609. If the computing system determines that a sport is depicted in the input media, the illustrative method 600 may proceed to the team identification blocks 610 and 612 described below.

Blocks 610 and 612 may be implemented by the computing system as part of a team identification process. As shown, the team identification process includes performing optical character recognition ("OCR") and string matching at block 610, as well as home team identification at block 612. Blocks 610 and 612 may be used in combination by the computing system to identify a specific team (or pairing of teams) playing in the sport identified in the input media, as well as whether a given team is the home or away team in the given game.

At block 610, the computing system may retrieve a stored list of strings that are associated with teams in the specific sport that was identified in the sport identification blocks described above. For example, if the result of the sport identification blocks was that a given input video is video of a professional basketball game, the computing system at block 610 may retrieve strings such as professional basketball team names, names of cities with professional basketball teams, basketball team name abbreviations, names of star players on certain teams, etc. The result of block 610, in one embodiment, may be a confidence level for each professional basketball team that indicates the confidence level that the game depicted in the given input media includes the given team as a participant. As one example, the output may indicate a non-zero confidence level for one or more professional basketball teams, but may indicate a zero confidence level for the majority of professional basketball teams.

In some embodiments, when analyzing video data as input, the computing system at block 610 may look for consistent presence of the given OCR keywords over time in the video. For example, if a given input video is ten minutes long and only includes the presence of a certain team name during twenty seconds of the video, this may be associated with a low confidence level or may be ignored, in some embodiments. This may occur, for example, because a television broadcast of a basketball game may include a news ticker (such as scrolling text along the bottom of the screen) that includes team names of basketball teams other than the two teams playing in the broadcasted game. In other instances, OCR keywords appearing during only twenty seconds of the video could indicate that only part of the video contains the correct team of interest. For example, a "Top 10" highlights section of a news broadcast could contain one or more short clips from the correct team, but the other short clips may not be related to the team of interest. If the computing system determines that the twenty second portion of the video appears to include game footage for the correct team, while the remainder of the video is not relevant to that team, the system may ignore the remainder of the video content when performing further analysis of the video with respect to that particular team.

Block 610 may additionally include applying a rule set associated with broadcasts of the given sport to identify which team is the home team based in part on the OCR results and their location on screen. For example, television broadcasts generally, or from a given broadcaster, may follow certain conventions in displaying the current score in a game, such as by always listing the home team above or before the "away" team (or visiting team). Thus, in one embodiment, if the OCR process recognizes that a corner of a video consistently displays the names of two cities or the names of two teams, along with corresponding scores, the computing system may determine that the team identified first onscreen is the home team in the given game.

Additional home team identification processes may be implemented by the computing system at block 612. Block 612 may include providing the input media as input to neural networks or other classification models that have been trained with video data of various teams' home games. For instance, if professional basketball was the sport identified in the input media above (e.g., as a result of blocks 604, 606 and 608), the computing system at block 612 may use classification models that have each been trained with video of home games from a different professional basketball team in order to identify whether the given input data appears to be similar to previous home game footage for any specific team. In one embodiment, these neural networks may be trained using video data, but may then be used with either video data or image data as input. In one embodiment, block 612 may be implemented at least in part using a convolutional neural network.

As a result of the combination of block 610 and 612, the computing system may determine that the input media depicts a certain pairing of teams playing the given sport, as well as an indication of which of the two teams is the home team. As will be appreciated, this determination may include weighting confidence levels and comparing to a threshold, similar to that described above with respect to sport identification. Once the team identification processes are complete, the computing system may access neural networks or other machine learning models that have been trained to identify objects associated with the relevant sponsor(s) for the given team(s) and/or the home venue, then may proceed to sponsor logo identification at blocks 614-618. While logo detection is illustrated in FIG. 6 as occurring in three sample blocks 614, 616 and 618, this is for illustrative purposes only. In many embodiments, there may be substantially more than three sponsor logo identification models used.

Blocks 614, 616 and 618 may each represent implementation of a different neural network or other classification model that has been configured to identify whether a given sponsor logo is present in the input media. For example, the computing system may store, for at least some home teams in each sport, a collection of classifiers that have each been trained with a different sponsor's logo(s), where the sponsors may be those that are known to advertise in association with home games for the given team identified above. Example processes for training classifiers to detect given sponsors' logos or other objects of interest are described above, as well as in co-owned U.S. Pat. No. 9,613,296, entitled "Selecting a Set of Examplar Images for Use in an Automated Image Object Recognition System," which is incorporated herein by reference. Given that applying models for all possible sponsors or logos capable of being recognized by the computing system to the given input media may be computationally expensive, the computing system may significantly reduce the computing time needed to perform the sponsor logo identification blocks as a result of the above sports-identifying and team-identifying blocks effectively serving as filters to narrow which sponsors' classification models to use in blocks 614-618. For example, in one embodiment, the computing system may store logo information and classification models for the sponsors of many different teams across different sports, yet the computing system at block 614-618 may only pass the input media to those classification models that have been trained to identify logos of the sponsors for a single team (the home team identified above) or for only two teams (the two teams identified in the specific game).

In some embodiments, two or more of the neural networks applied at blocks 614-618 may have been trained using different neural network architectures, but with the same training data. A weighted sum or other known process may be used to determine an overall result based on the application of the multiple models. Various techniques known in the fields of computer vision and image processing may be employed in training or applying the models. For example, the computing system may use cross correlation techniques and/or a neural network with a region proposal network in order to localize a logo within an image, such as to determine a bounding box around the logo. The computing system may apply tracking techniques across different frames of input video, such as by a tracker of the cross correlation result being used to track the bounding box across different frames and reseeding if the tracker drops the target logo in a given frame.

In some embodiments, the output of the neural networks or other classification models used in blocks 614-618 may be both a logo and source. For example, the source may represent the location of the identified logo within a real-world scene depicted in the input media. Thus, a sponsor logo that is known to be both on a rafter sign in an arena and also on a basketball stanchion in that arena may have two distinct classes that a classification model may be trained to identify (e.g., one class may be represented as <stanchion, logo1> and the other as <rafters, logo1>).

Once one or more logo and source pairings are identified based on the output of the neural networks at block 619, the computing system may proceed to the logo quality identification blocks 620 and 622. At block 620, the computing system may estimate the blurring of the logo in the input media (e.g., determining a percentage of blurring, or conversely a clarity percentage estimating how clearly the logo can be seen by a human viewing the input media). At block 622, the computing system may estimate the occlusion of the logo. For example, the computing system may determine a percentage of the logo that is not visible in an input image or in one or more frames of video (e.g., the logo may be partially off-screen or partially blocked by another object in the image). The logo name, source, blur estimation percentage and occlusion estimation percentage may then be used by the computing system to produce a media report at block 630, and/or may be used as input to one or more media value determinations similar to those described above. As discussed above, the media report may include information for a number of different sponsors' logos, and may be based on the results of multiple passes through the illustrative method 600 using different input media. In one embodiment, the media report may identify the given game (e.g., identifying the two teams, and the location and the date of the game), and may include various information for each sequence of video in which a logo was detected. For example, for each sequence, the media report may identify the logo(s) depicted in the sequence, the source or location of the logo, the blur percentage of the logo, and the extent of occlusion, if any.

In some embodiments, additional methods may be used by the computing system to enhance or verify the determinations made at various points in illustrative method 600. As an example, the confidence levels for positive identifications of a given home team based on analysis of the input image or video data may be increased based on retrieved team schedules. For instance, if the computing system determines that a given video appears to be from a home game of a particular team based on the video analysis discussed above, the computing system may retrieve that team's schedule to determine whether the given team had a home game (and potentially whether it was against an opponent recognized in the video) on the capture date of the video. The capture date of the video may be determined from video metadata, text or timestamp of a social network post that included the video, from television broadcast information, and/or other methods. If the image or video analysis is able to identify the two teams playing in the game and the capture date of the video, but does not have sufficient confidence regarding which team is the home team, the team schedule information may be sufficient in some embodiments to determine the home team if the opponent and date match the schedule.

In some embodiments, to supplement and/or confirm the confidence level determinations of the image and video classification models discussed above, the computing system may use text classification models applied to text of a social media post or page in which the image or video is embedded or linked. For example, a textual classifier may provide a confidence score indicating how confident the model is that a particular social media post relates to a specific rights holder and/or sponsor based on the text of the post. This confidence score may be weighted and combined with a corresponding confidence score determined from the image or video itself, as described above.

In some embodiments, to supplement and/or confirm the confidence level determinations of the image and video classification models discussed above, the computing system may use other supplemental data and/or logic. For example, the output of a machine learning model and/or classifier for a particular image or video may be a forty percent likelihood that a particular object, such as a basketball stanchion, contains a particular sponsor's logo. One or more blocks of the method 600 may indicate that the particular image or video is of a known venue for a particular sports team. Thus, the supplemental logic may supplement, confirm, or replace the output of the machine learning model and/or classifier based on the supplemental data that a particular sponsor is associated with the particular object (e.g., the basketball stanchion identified by the machine learning model).

In some embodiments, the output of certain object classification models may be used to determine the focal point of a given frame. For example, if a ball or puck is identified as an object in a given image or frame, this location of the ball or puck may be considered to be the focal point of the image (e.g., the location of the ball may be where the typical viewer would be focusing when watching a basketball game). Focal points may be determined in other manners depending on the sport, such as by analyzing the movement of objects across frames and/or the grouping of objects in certain areas to estimate where the in-game "action" is currently concentrated. In some embodiments, a logo appearing near the focal point of an image or frame may be given a higher score for purposes of media valuation than one appearing far from the focal point (e.g., a weight may be applied to the score based on the proximity of the logo to the frame's focal point). In some embodiments, if the focal point is not identified based on object recognition, the middle of the frame may be used as the default focal point.

Figure 7:
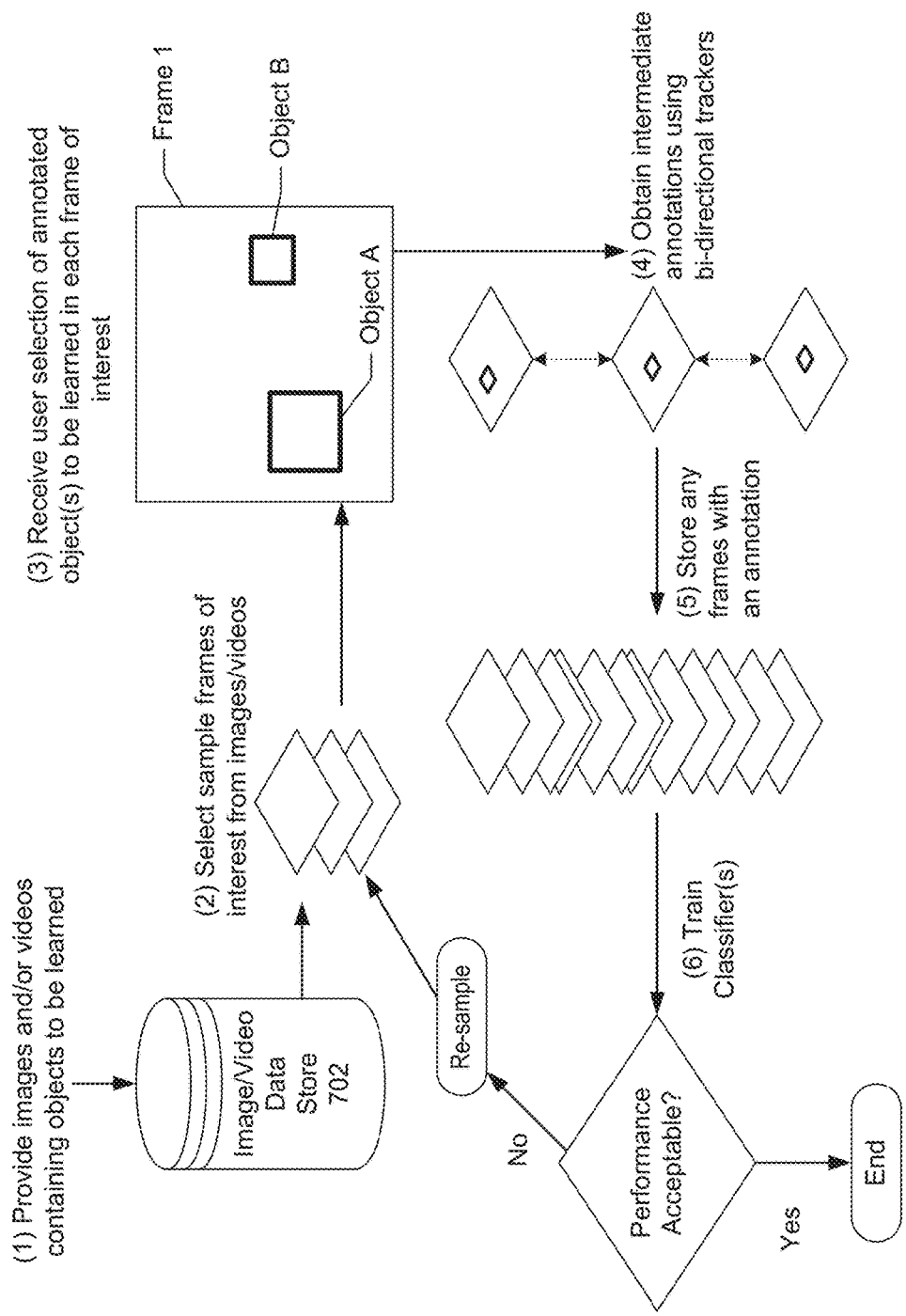
FIG. 7 is a an illustrative flow diagram for training one or more classifiers or classification models to identify specific objects of interest in video data.

FIG. 7 is a an illustrative flow diagram for training one or more classifiers or classification models to identify specific objects of interest in video data. The illustrated method may be performed by computing system 302 in order to generate and store trained classifiers or other classification models or machine learning models that may then be used by the computing system to identify specific objects or classes of objects in subsequently provided image or video data. The illustrated method begins with input images and/or video being received, retrieved or selected from image and/or video data store 702. This image and/or video data may be a number of video files and/or image files that are known to contain or are likely to contain objects of interest with respect to other aspects of the present disclosure. For example, these objects may be logo objects, other brand sponsoring or advertisements, sporting objects (such as a basketball, basketball stanchion, etc.), and/or any other real-world or computer-augmented object appearing in image or video data and which a user is interested in training a classification model to detect. In embodiments in which the classifiers will be used to identify objects of interest in images or video depicting real world sporting events, it may be desirable to select the training input media to depict similar real world sporting events (e.g., selecting footage of the object(s) of interest in real world settings as opposed to training the classifiers with a clean image or video that depicts only the object of interest without a surrounding environment depicted).

As an example, if the classifiers being trained in FIG. 7 are intended for later use in identifying sponsor logos or sponsorship opportunities for professional basketball games, the training data may include a plurality of video files recorded from television broadcasts of professional basketball games and/or fan-recorded images or video from such games (such as from media posted to a social network). It will be appreciated that the level of variety in what is depicted in the different provided images or video files may depend on how much variety may be expected in the appearance of the object(s) of interest in different images or video. For example, if an object of interest for which a classifier will be trained in FIG. 7 is as specific sponsor's logo as it appears on a specific banner hanging in the rafters of a specific arena, training videos may be selected to at least primarily be video of basketball games in the given arena. If a classifier will instead be trained to identify a class of objects that appear in many different arenas with a potentially different appearance in each (such as training a classifier to identify all instances of a basketball scorer's table in any arena within a given league or for a given sport), training videos may include footage from a variety of different teams' games in a variety of different arenas.

As will be discussed below, what is considered a discrete object or class for purposes of the training in FIG. 7 may be at least somewhat dependent on user input. For example, whether a basketball stanchion with a sponsor logo printed on it is considered to be a single object, two objects (e.g., the stanchion itself as an object, with another smaller object within its bounding region that represents the logo as a second object), or more than two objects (e.g., separate object bounding boxes being defined for each of multiple logos appearing on the stanchion) may be dependent on user input discussed below. For example, different objects or classes of objects that different classifiers may be trained to identify in one or more embodiments could be labeled as "basketball stanchion," "basketball stanchion with any sponsor logo," "basketball stanchion with Company A's logo," "Company A's logo," "ABC Arena stanchion," etc.

The computing system at step (2) of FIG. 7 may select sample frames of interest from the input media. In the case of images as input, there would not be a need to select sample frames, but in the case of video it is desirable to minimize the number of images or frames that a annotating user is requested to review in step (3). Accordingly, the computing system may select sample frames at a certain sampling rate that is either predefined in the system based on a learning process from previous training sessions, provided as user input, and/or dependent upon the nature of the underlying video (e.g., how fast objects are expected to change location between frames in the given video). As one example, the sampling rate may be one second, such that for a given video file, the computing system may select sample frames at one-second intervals (e.g., if the video contains 60 frames per second, the sample frames may be selected as frame 1, frame 61, etc.)

At step (3), the computing system may generate a user interface for display to an annotating user (such as a user directly interacting with the computing system locally or by the user utilizing a client computing device in communication with the computing system via a network). The annotating user may be a user who is associated with training classification models and is tasked with indicating where objects of interest to that user or to another individual or entity appear in training video sample frames. The user interface may display a sample frame, enable the user to draw a bounding region (such as using a cursor or touch gesture to draw a rectangle or other shape) around the object of interest, label the specific object of interest (such as from a menu of labels or classes that the user has set as the objects for which classifiers are being trained), and enable the user to move on to the next sample frame when all objects of interest in the given frame are labeled. The bounding regions may be stored in the data store 702, such as by storing an indication of the given frame number for the given video file, the pixel coordinates defining each user-selected bounding region, and the object or class label associated with each bounding region.

Once the annotating user has defined bounding regions for objects of interest in the sample frames of each video, the computing system may apply bi-directional trackers to attempt to track the movement of the objects between successive sample frames. For example, if the annotating user defined a bounding box for a certain object in frame 1 of a given video and then defined a bounding box at different coordinates for the same object in frame 61, the computing system may try to track the movement of the object across each of frames 2-60 and store estimated bounding box information for the object with respect to each of those frames. Accordingly, although the annotating user may have only provided annotation information for 1/60th of the frames of a given video, a substantially larger percentage of the frames may have object annotation data stored after the tracking process is complete at step (5).

The computing system may then separate the annotated image and/or video data into separate training and testing sets (not illustrated). In one example, 90% of the annotated media files may be used as training data and 10% may be set aside as testing data, while other known approaches for defining testing and training sets may be employed in other embodiments. At step (6) the computing system may train classifiers for each object of interest based on the annotation data marking the depictions of the given object of interest in the training images and/or video. Methods of training classifiers or other machine learning models have been described in more detail above. The performance of the resulting classifier(s) may then be determined, which may include both checking the success rate in correctly identifying the object(s) of interest in the set-aside test data, as well as confirming that the performance speed is acceptable.

If the performance metrics fall below a threshold level, the computing system may re-sample the video data and return to step (3) to receive user annotation data for the newly sampled frames. For example, if the sample frames were previously selected to be the frame at one second intervals, the computing system may select additional or alternative sample frames at the half second markers (e.g., if frames 1 and 61 were two sample frames previously selected, new sample frames may be selected to include frames 31 and 91). In some embodiments, the computing system may present a recommendation based on the performance of the classifiers whether to either (a) re-use the previous sample frame data as well as define new frames or (b) to discard the previous sample frames' annotation data and start over with replacement sample frames. Once the performance of the classifier(s) as trained is acceptable, the trained classification models may be stored for later use.

ADDITIONAL EXAMPLES

As further illustration of features implemented by the computing system in certain embodiments, consider analysis of video from a television broadcast of a car race. In one embodiment, the computing system may determine the exposure by each advertising source based on specific features of an object captured in the video. For instance, the computing system may determine that the best locations for advertisement exposure are logos placed on the rear wing and nose cone of a race car based on factors described herein (such as based on position and clarity analysis of the various logos appearing in the video, among other considerations). Additionally, the computing system may determine that a specific combination of a car design and decal placement hurts visibility of the decal's logo. For example, based on image analysis of a frame of video that includes a race car, the computing system may determine that a logo placed on an uneven surface on the wing of the car causes the visibility of the logo to be poor from a given viewing angle of the camera that captured the video (such by the computing system identifying that part of the wing causes partial occlusion of the logo).

The computing system may further determine, for example, that video footage captured from an onboard helmet camera that occasionally appears in the television broadcast is an under-utilized highlight type from a sponsorship standpoint because there are no branding or logos that are clearly visible from this camera viewing angle. This information could be used to determine, for example, that sponsor decals should be added to the driver side and/or front of any race car that will have a driver wearing an onboard helmet in a manner that will optimize viewing of the logos from the onboard helmet camera (such as by using this information to choose the angle and position of the decal). In some such embodiments, the computing system may provide video data to a classification model that has been trained to identify specific real-world objects or portions of objects (in the above case, for example, discrete portions of a race car such as a front hood or the top surface of the interior dashboard), and may then determine when an object or object portion is prominently displayed in video data without an accompanying brand or logo included on the object. Such a determination may indicate that the identified object or portion of an object is a good candidate location to place an advertisement, and the computing system may generate a recommendation to a rights holder identifying the sponsorship opportunity. The recommendation may include, for example, an indication of the recommended angle to place the branding or advertisement to be best viewed from a particular camera location of video analyzed by the computing system (e.g., from an onboard helmet camera, from a stationary press camera in the stands, etc.).

When a report is generated for a given rights holder, such as an arena or sports team owner, the computing system may include an analysis of an existing television rate card relative to the computing system's own generation of a "social" rate card. For example, based on the computing system's media value determinations from the analysis of social media images and videos, the computing system may determine that the media value actually generated in the previous season from social media alone matched or exceeded the television rate card previously given to the sponsor for that season. Based on this determination, the computing system may recommend that the rights holder double the rate card for next season in order to capture the full value of the sponsorship when both social media and television exposure are considered. In some embodiments, the computing system may determine a social contribution percentage, indicating the computing system's determined "social" rate for a given sponsor as a percentage relative to the rate previously provided to that sponsor (such as in a television rate card).

In some embodiments, the computing system may generate one or more user interfaces that may be considered to provide a real-time "dashboard" that a rights holder, sponsor, or other user may view and interact with during a sporting event. For example, a user may view the media value of one or more sponsors' advertisements in real time or near real time during a live broadcast of a sporting event. The user may additionally or alternatively view a stream of social media posts relevant to the sponsorship in near real time as the posts are identified by the computing system. In one embodiment, a user interface may include a live video broadcast of a particular sporting event, with graphical overlays superimposed over the video. These overlays may include, for instance, visual bounding boxes around sponsor logos recognized by the above techniques, which may follow movement of the logo from frame to frame, as well as graphical indicators of the media value for that exposure. For instance, the longer that a particular logo is on-screen, a graphical bar and/or numeric counter may represent or indicate the gradually increasing dollar value of that brand exposure using the above techniques.

Figure 8:
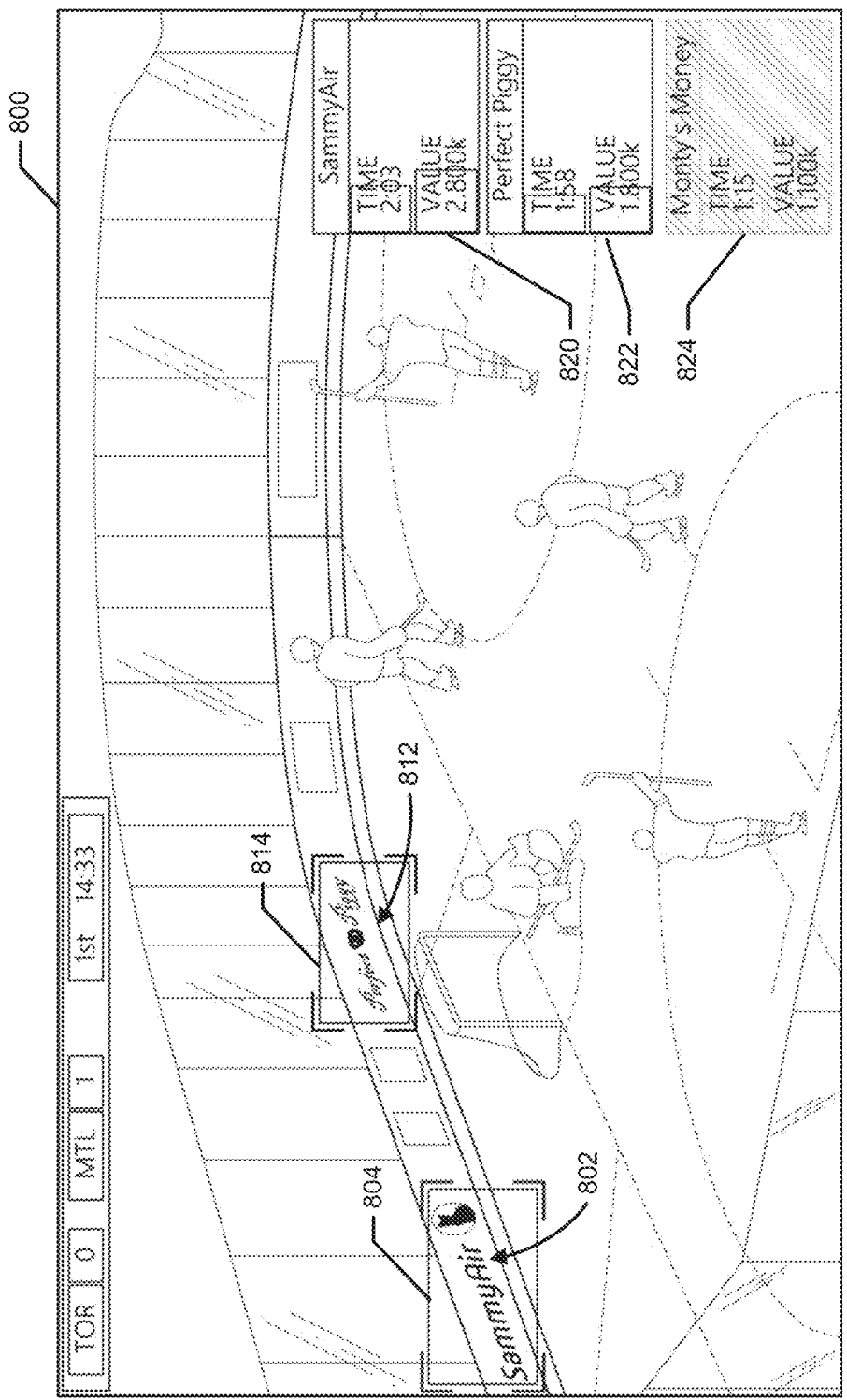
FIG. 8 illustrates a graphical markup of a video frame highlighting identified logos along with determined media values.

In some embodiments, the dashboard user interface that includes graphical overlays incorporated within or on top of the video stream may include graphical indictors of media value for each of multiple sponsors associated with the sporting event. An example is illustrated in FIG. 8. As shown in FIG. 8, which may be one sample frame 800 from an augmented broadcast of a sporting event, two logos have been detected by the computing system (SammyAir logo 802 and Perfect Piggy logo 812), and the computing system has augmented the displayed video with visual bounding boxes 804 and 814 surrounding the respective detected logos. While illustrated as bounding boxes in FIG. 8, the detected sponsor logos or other detected advertisements present in the video data may be marked in other manners in other embodiments. For example, marking a sponsor logo may include overlaying another visual bounding shape around the sponsor logo, an outline or tracing of the shape or outer edges of the logo, changing a brightness or contrast of the sponsor logo (e.g., visually highlighting the detected logo), and/or other techniques to draw a viewer's attention to the logo. The augmented video frame further includes three boxes 820, 822 and 824 in the lower right of display of FIG. 8, which may each be associated with a different sponsor and each include two bars and numeric amounts—(1) an elapsed time that a logo has been on-screen in the broadcast, and (2) a media value amount for that exposure determined by the computing system. Such a user interface may be presented for display to a sports executive for a given team, for instance, during a live broadcast of his team's game.

In the illustrated example frame 800, box 824 may be presented as minimized, shaded, or at an increased transparency level relative to boxes 820 and 822 to represent that the corresponding logo ("Monty's Money") is not currently onscreen or in-frame. Accordingly, the time and value bars and numeric amounts for box 824 may be presented as static across the next few seconds of video, whereas the time and values in boxes 820 and 822 (which correspond to logos 802 and 812 that are currently onscreen) may animate or change to reflect additional time and value for each second or other time period that the respective logo remains visible. The computing system may provide a platform whereby options are presented for the user to switch to watching different games, or to view social media feeds with similar displayed information.

In one embodiment, in order to generate an augmented video display such as that illustrated in FIG. 8, the computing system may provide at least a first frame of the incoming streaming video data to each of a plurality of classification models that are each trained to identify depiction of one or more sponsor logos. The computing system may then identify a sponsor logo within at least the first frame based at least in part on output of one or more of the plurality of classification models. The system may then track an in-frame location of the sponsor logo across a plurality of subsequent frames in which the sponsor logo is depicted. The system may then augment image data in at least the plurality of subsequent frames to visually mark the sponsor logo. The system may additionally determine an aggregated duration of time that the sponsor logo has been depicted in the video data, and determine an aggregated media value attributable to appearance of the sponsor logo in the video data based on any of the various approaches discussed herein. In some embodiments, the aggregated media value displayed may be based at least in part on real time ratings or viewership data associated with the broadcast of the video data by a television network or other broadcast network (where such data may be received in real time from a media measurement or media analytics service) and/or based on viewership of portions of the video content on one or more social media networks (as detected by the computing system in various ways described herein).

Additional Features for Automated Analysis Media Items to Determine Sponsorship Value In some embodiments, a media sponsorship value may be determined that includes consideration of the aggregated media value of images and/or video from one or more media channels that are determined to include depiction of a sponsored object (e.g., a company logo). Example media channels include social media networks, broadcast networks (e.g., a television broadcast), streaming media networks (e.g., a streaming video service), and/or digital networks. The value determined may represent a media cost equivalent, which may be the amount of money that a company would have had to spend to purchase an approximately equivalent advertising space in one or more media channels.

The systems and methods described herein, such as for media sponsorship valuation, may be intrinsically tied to computer technology because such solutions may use computer vision techniques. The systems that are described herein may use computer vision techniques that use neural networks, classifiers, machine learning, and/or object recognition and are provided with image and/or video data as input (or provided with features programmatically derived from image or video data). Further, the determination of media sponsorship valuation may be intrinsically tied to computer technology because such valuations may include analysis of items that only exist due to the advent of computer technology, such as items that are retrieved from social network services or streaming network services.

The systems and methods described herein, such as for media sponsorship valuation, may improve computer-related technology. In some embodiments, the system may process thousands or hundreds of thousands of media items that can include large amounts of data (e.g., gigabytes, terabytes, or petabytes of data). The techniques described herein may efficiently identify objects in the media items for valuation, such as by using algorithms that classify the data into manageable chunks for object recognition processing. For example, an efficient algorithm for object recognition for sponsorship valuation may first classify the media item to identify a particular scene, sport, team, or other identifying information in the media item that further identifies a subset of classifiers, such as neural networks, for specific sponsor objects. Without such object recognition algorithms, the processing times for objection recognition may be unacceptable or a system may be unable to identify an object for sponsorship valuation altogether.

Figure 9:
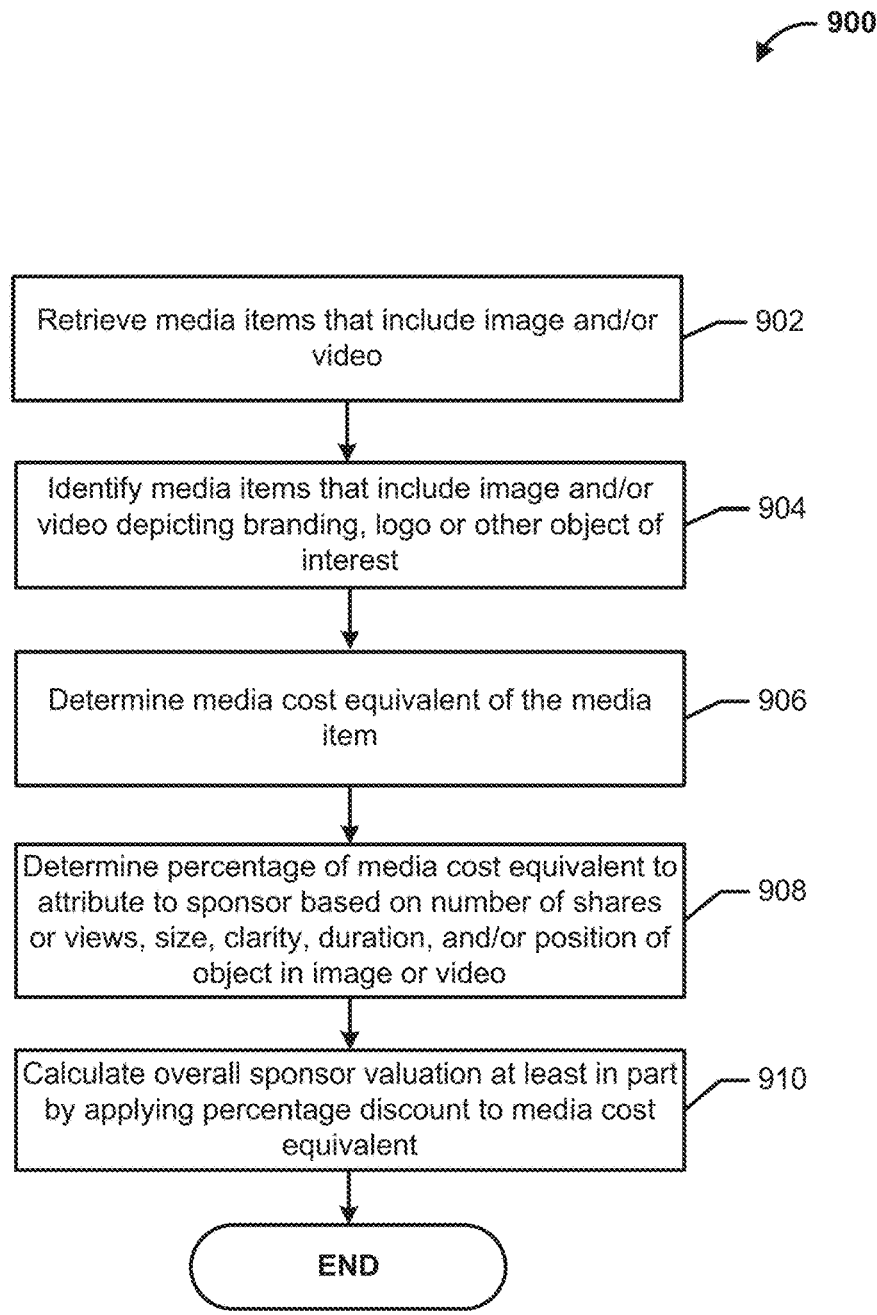
FIG. 9 is a flow diagram of an illustrative method for determining an overall sponsor valuation based on images and/or video appearing in media items.

FIG. 9 is a flow diagram of an illustrative method 900 that may be implemented by a computing system, such as system 302, for determining an overall sponsor valuation based on images and/or video appearing in one or more media items. At block 902, the system may retrieve media items from one or more media channels. The media items can be posted to one or more social media network services, broadcast by one or more broadcast networks, streamed by one or more media networks, and/or made accessible by one or more digital networks. The retrieved media items, which originate from the broadcast networks, can be media items that are transmitted by or to the broadcast networks. In some embodiments, the system can communicate with and/or retrieve media items from the one or more media channels via an API. In some embodiments, the API (such as an API for a social media network service) enables the system to query the one or more media channels. The system can query the API with an input parameter such as a keyword, tag, or category, and/or to retrieve media item result sets.

At block 904, the system may identify, from the retrieved media items, one or more media items that depict an object associated with a sponsor (e.g., a logo or other visual content intended to function as an advertisement for the sponsor). The image or video may be identified to include the object of interest based on the various methods described herein. The system can identify a media item that depicts a sponsor object associated with a sponsor where the sponsor object is detected based at least in part by a machine learning model based on image data or video data of the media item, The system can provide a feature of the first media item as input to a classifier associated with one or more sponsors. The classifier can be trained to identify, based on the input feature, a target image object associated with one of the one or more sponsors. The classifier can be trained with a large amount of training data that includes many sponsor objects (e.g., logos). In some embodiments, the classifier can be trained with at least some supervised machine learning. In other embodiments, the classifier can be trained with at least some unsupervised machine learning. The computer vision algorithm used by the system may use classification logic to narrow down the applicable scene, object, sport, team, or other identifying information in the media item that further identifies a subset of classifiers for specific sponsor objects. In some embodiments, the system may store classification data that a particular venue or sporting participant is associated with one or more sponsors. Thus, during the computer vision process, if it is determined that an image or video is for a particular venue or sporting participant, then the system may apply the classifiers that correspond to sponsors that are associated with the particular venue or sporting participant. Additional details regarding identification of objects or other features in images or video with computer vision are described in further detail above with respect to FIG. 6.

Next, at block 906, the system may determine a media cost equivalent of the media item based on reach and/or engagement data associated with the media item, which may be accessible via the respective media channel source of the media item. As one example with respect to broadcast network content in which advertisements can be purchased, the cost to purchase a 30 second advertisement may be multiplied by the amount of time that the brand was displayed in the video, and further adjusted based on actual viewership numbers when available. In situations in which actual viewership numbers or "reach" data is available (such as on a video sharing website in which the number of page views or video views is listed on a webpage or is otherwise available), the number of views that an image or video receives may be considered in the sponsorship valuation. Additionally or alternatively, user engagement may be considered (such as the number of users who selected a link or URL associated with an image or video posted to a social network or other network location).

For example, a media cost equivalent may be determined, in some embodiments, based on a blend of CPEE (Cost-Per-Engagement-Equivalent) and CPME (Cost-Per-Thousand-Equivalent) if a given sponsor were to purchase the media exposure that was instead gained through other means (such as users posting media to social networks). Depending on the embodiment and the available data, an average CPME for the network as a whole may be used (e.g., the average CPME for advertisements on a specific social network), or more granular CPME data based on keywords may be used. For media items that do not have exact reach metrics or viewership data, a greater weight may be applied to engagement numbers. Some media channels may provide actual reach data (e.g., data regarding the number of users who in fact viewed a media item), while others may provide this information more selectively, such as by restricting such information to the owner of the account of the media item. Accordingly, in some embodiments, accounts that are owned by the sponsor or its affiliate (which may be referred to herein as a sponsor "owned and operated" account) may have actual reach data available, whereas similar media from the same event that is posted by a third party may not have actual reach data available. In one example, a formula may be applied as follows:

$$\text{Media cost equivalent} = ([\text{Engagements}*\text{CPEE}]*w_1) + ([\text{Reach}*\text{CPME}]*w_2).$$

In applying the above formula for a non-owned and operated account or where actual reach data is otherwise not available or not reliable, the weighting $w_1$ with respect to engagement may be set relatively high (such as 90% or 0.9), while the weighting $w_2$ with respect to reach may be set relatively low (such as 10% or 0.1). For example, a sponsor may be most interested in the number of users who actually saw the object depicted in the media item, but the system may need to estimate this number based on "likes," responses, click-through numbers, or other engagement numbers as a proxy when view numbers are not available or not reliable. As described herein, the percentage or total media values attributable to different sets or types of accounts may be determined and displayed to a user. For example, a first value may be determined for "owned and operated" accounts, and another for non-"owned and operated" accounts. For example, a sponsor may be interested to know that organic social media sharing of a video clip accounted for a certain percentage or dollar value of the total media cost equivalent, as opposed to views of social media that the sponsor itself posted for viewing by users already following or subscribing to the brand owner's social media account(s).

A variation of the above media cost equivalent formula for a video hosted on a video sharing service may be, for example:

---
Media cost equivalent = (Views * [Network Cost-per-View] * [Reach Weight] * [30-second cost equivalent]) + (Engagement * [Network Cost-per-Engagement] * [Engagement Weight]).

---

In some embodiments, the system can determine the media cost equivalent based at least in part on data associated with a media channel by which the media item has been distributed. Example data can include a quantity of engagements with the media item or a quantity of shares of the media item. The system can determine the media cost equivalent based at least in part on a quantity of engagements with the media item, a cost per engagement equivalent for the media item, a quantity of views or shares of the media item, and a cost per thousand equivalent for the media item. The system can determine the media cost equivalent by calculating a first cost from (i) a quantity of engagements with a media item and (ii) a cost per engagement equivalent for the media item; calculating a second cost from (i) a quantity of views or shares of the media item and (ii) a cost per thousand equivalent for the media item; and calculating a third cost by combining the first cost and the second cost. The system can determine the media cost equivalent based at least in part on a quantity of engagements with the media item, a network cost per engagement equivalent for the media item, a quantity of views or shares of the media item, and a network cost per view for the media item. The system can determine the media cost equivalent by calculating a first cost from (i) a quantity of engagements with a media item and (ii) a network cost per engagement equivalent for the media item; calculating a second cost from (i) a quantity of views or shares of the media item and (ii) a network cost per view for the media item; and calculating a third cost by combining the first cost and the second cost.

Once a media cost equivalent is determined for a given media item (such as for a post on a social media network or a television broadcast depicting the sponsor object), the percentage of the total media cost equivalent to attribute to a given sponsor may be determined at block 908. In some embodiments, the percentage to apply to the total media cost equivalent may generally correlate with how prominent the sponsor object is in the image, video or other media. This percent attribution for a given photo or video may be based on various factors, such as size, clarity, duration, number of appearances, number of other logos, and position of the sponsor object in relation to the full image or video. In some embodiments, determining the percentage can include calculating at least one of: a size of the sponsor object in the media item relative to a frame of the first media item; a clarity of the sponsor object in the media item relative to a reference object; a duration of the sponsor object in the media item relative to a total duration of the media item; or a position of the sponsor object in the media item relative to a reference object in a reference frame.

The system can further calculate the percentage using one or more of the following techniques, such as by using computer vision scoring techniques. The features of the image or video, such as a size, clarity, duration or position of the sponsor object or other sponsor objects in the media item, can be determined based on an automated analysis of the image data or video data of the media item. The system can determine a size of the sponsor object (in a height and width measurement such as a pixel height and a pixel width) in the media item relative to a frame of the first media item, where the frame includes a height and width measurement (such as another pixel height and a pixel width). A method for determining the percentage based on the size of the sponsor object can include determining a ratio of the measurements of the sponsor object to the measurements of the frame of the media item. The system can determine the clarity of the sponsor object in the media item relative to a reference object, such as a stock photo. A reference object may be a visual depiction of a particular with near-optimal clarity. A method for determining the percentage based on clarity can include: retrieving a reference object that corresponds to the sponsor object in the media item, where the reference object is a near-optimal presentation of the sponsor object; and comparing the reference object to the sponsor object in the media item, where comparing can include the system using computer vision and/or classifiers to output a degree correspondence between an image of the reference object and the image of the sponsor object in the media item. A method for determining the percentage based on the duration of the object in the media item relative to a total duration of the media item can include: calculating a duration of time that the sponsor object is present in the media item; calculating or retrieving a total duration of the media item; and determining a ratio between (i) the duration of time that the sponsor object was present in the media item and (ii) the total duration of the media item.

In some embodiments, a method for determining the percentage can include a time based deduction. A time based deduction for a video can take into account a total duration of the video, a likelihood regarding the parts of a video the user may watch (e.g., users may tend to watch the beginning of a video and not the end), and/or the likelihood of how long a user would watch the entire video. For example, if a video is five minutes long and has 100 views, the likelihood that all 100 viewers watched the full five minutes may be unlikely. Therefore, the system can place a deduction on the media cost equivalent based on the actual time that a sponsor object appears within the video. For example, a sponsor object that is viewed within the first 30 seconds may receive 100% of the media cost equivalent value, but if the sponsor object only appears during seconds 4:25-4:55, then the percentage value may be 5% of the cost equivalent value. This can be tracked via a computer vision scoring algorithm that can keep track of each exposure frame within a video (e.g., each frame of a video that depicts the sponsor object) and can identify where that frame is in comparison to the duration of the entire video. The time based deduction method for determining the percentage can further include: retrieving a default percentage for the time based deduction (e.g., 100%); identifying one or more playback positions of the sponsor object in the first media item; identifying, from the one or more playback positions, a first chronological appearance of the sponsor object in the first media item (e.g., the first time a sponsor object appears could be during seconds 4:25-4:55 of a video); calculating an adjusted percentage (e.g., 5%) for the time based deduction from the default percentage, the first chronological appearance, and a total duration of the first media item (e.g., a five minute long video). The 4:25-4:55/5% example described above is an application of the time based deduction. Thus, the adjusted percentage of the media cost equivalent may be greater where the first appearance of the sponsor object is closer to the end of the media item.

In some embodiments, a method for determining the percentage can include a prominence calculation. The prominence calculation can represent the difference between a sponsor object that physically appears in the sporting event itself (e.g., someone physically at the sporting event would see it) versus one that is digitally overlaid on the video (only someone watching the video or looking at a photo would see it). The prominence calculation method can include applying computer vision techniques to attempt to determine one or more objects (such as an attempt to determine one or more physical objects at a venue including stanchions, goal posts, tunnels, and other areas for presenting sponsor information) in a media item. However, if a particular physical object cannot be identified with respect to the determined sponsor object in the media item, then the prominence calculation method may increase the likelihood that the sponsor object is a digital overlay in the media item since a physical object containing the sponsor object could not be identified. Another prominence calculation method can include: detecting that the sponsor object is in the media item using computer vision techniques and/or classifier processing; providing a second feature of the media item as input to a second classifier associated with one or more sponsor objects, where the second classifier is trained to output a likelihood that the sponsor object in the media item corresponds to a physical object at a venue or the sponsor object corresponds to a digital overlay in a first image or video of the venue of the media item. In some embodiments, the percentage for prominence may be greater if there is a determination that the sponsor object is likely a digital overlay since the sponsor object may be more readily recognizable by viewers as opposed to a sponsor object that is in the physical background of a video or photo, such as a physical sign. Additional methods for detecting prominence and/or determining a prominence percentage are described herein.

Once the percentage attribution is determined, the overall sponsor valuation may be determined at block 910. For example, if the media cost equivalent at block 906 is determined to be $10,000, and the percentage to attribute to the given object/sponsor is determined at block 908 to be 50%, the overall sponsor valuation for the given sponsor may be determined to be $5,000 at block 910 (i.e., $10,000 multiplied by a 0.5 discount off the full value). Further, the system can calculate an overall sponsor valuation for a single media item or for multiple media items. For example, many media items (e.g., hundreds or thousands) related to a particular sponsor can be processed by the method 900 and the overall sponsor valuation may include an aggregate value of the calculated media cost equivalency and corresponding percentages. Further, the system can calculate an overall sponsor valuation that includes media items from multiple media channels, such as social media network services, broadcast networks, streaming media networks, and/or digital networks.

In some embodiments, the system can present the overall sponsor valuation and/or other related data in a report or a user interface. Additional reports or user interfaces are described in further detail herein, such as with respect to FIGS. 5A, 5B, and 8. The system can generate a user interface or report that includes the overall sponsor valuation, a first valuation associated with a sponsor for a first social media network, a second valuation associated with the sponsor for a second broadcast network, and/or one or more additional valuations associated with the sponsor for additional media channels. In the user interface or report, for each of the first social media network, the second broadcast network, and/or the other media channel, the user interface or report may further include at least one of a volume, a number of impressions, or a number of engagements. The system can generate a user interface or report that includes, for each of a plurality of objects (such as a physical object like a bobblehead or stanchion) associated with the sponsor that have been identified in image data or video data of media items, at least one or more of: a number of posts, a reach estimate, a number of engagements, or a media item valuation.

Additional Features for a Dynamic Sponsorship Exchange

Aspects of the present disclosure relate to a dynamic sponsorship exchange. For example, advertisement space within a venue, such as an arena, can be sold as one element of a larger sponsorship package for a given rights holder before the start of a sponsorship period, such as before the start of a season. The advertising spaces can include static displays (e.g., a tunnel, shot clock, or arena floor) or dynamic signage. Example dynamic signage include rotational display devices (e.g., an LED device that can change advertisements on-demand or based on a set intervals) and placeholder spaces where a digital advertisement can be inserted into the space (e.g., a green screen). LED display devices can be sold for periods of time, such as thirty second increments. Thus, the sponsor can be guaranteed that amount of advertisement time on the dynamic signage, such as for thirty seconds for each sporting event or for each sporting event of a season. In this traditional advertising model there may be no logic to when each sponsor is given its allocated time. This may be expected in a traditional television broadcast environment where the audience size may not fluctuate much and it may not significantly impact a sponsor's media value (e.g., the viewership of a particular live sporting event may be 450,000 and may not fluctuate much during the sporting event). However, content consumption patterns by viewers (e.g., such as consuming content via social media networks and/or streaming networks) have begun to vary greatly, which appears to be an increasing trend especially among younger generations and younger viewers. For example, a compelling sports highlight may rapidly spread through social media and may gain a large number views and/or engagements (e.g., millions of views and/or engagements) in mere hours. Accordingly, a real or near-time system may advantageously allocate control of dynamic signage among a pool of sponsors and rights holders in an electronic exchange. The exchange can allow sponsors and/or rights holders to efficiently bid on advertisement opportunities or to accept such bids during live sporting events or may implement automatic bidding rules established by sponsors. In some embodiments, the rules described herein may programmatically identify moments in a sporting event that are likely to be shared or depicted in large volume in one or more media channels, e.g., a "viral" highlight. The exchange, sponsor, or rights holders systems may dynamically generate valuations and/or bid values for the signage opportunities based on real-world events.

The systems and methods described herein, such as for dynamic allocation of signage opportunities at physical locations, may improve computer-related technology. In some embodiments, traditional signage systems display particular sponsor messages at particular times according to a predetermined schedule where the schedule may be set well in advance of a sporting event and/or without the ability to modify the schedule during the live sporting event. Thus, the automatic rules described herein may improve the efficient allocation of signage assignments between sponsors and rights holders and/or may automatically cause dynamic signage (such as display devices) to present different visual sponsorship data. Further, the exchange between rights holders and sponsors, which includes rights holders exchanging dynamic signage rights in exchange for consideration from sponsors, may be based on information that includes expected viewership across different media channels and/or based on overall media valuations that may be accessible to rights holders and sponsors. As described herein, the overall media valuations may be computed based on computer vision techniques that may be inherently tied to computer technology.

In some embodiments, rights holders systems can use the exchange to better manage pacing of sponsorship campaigns. For example, a particular sponsor may have paid five million dollars for ninety seconds of a tunnel LED display device throughout the season, but the sponsor may have only received approximately one million dollars of media value by the season halfway mark. Thus, the rights holder could give the sponsor more time on dynamic signage at the physical location or give the sponsor access to highly valued opportunities to increase the chances that the sponsor will benefit in greater media value from a compelling highlight gaining popularity in one or more media channels, such as by going "viral."

Figure 10:
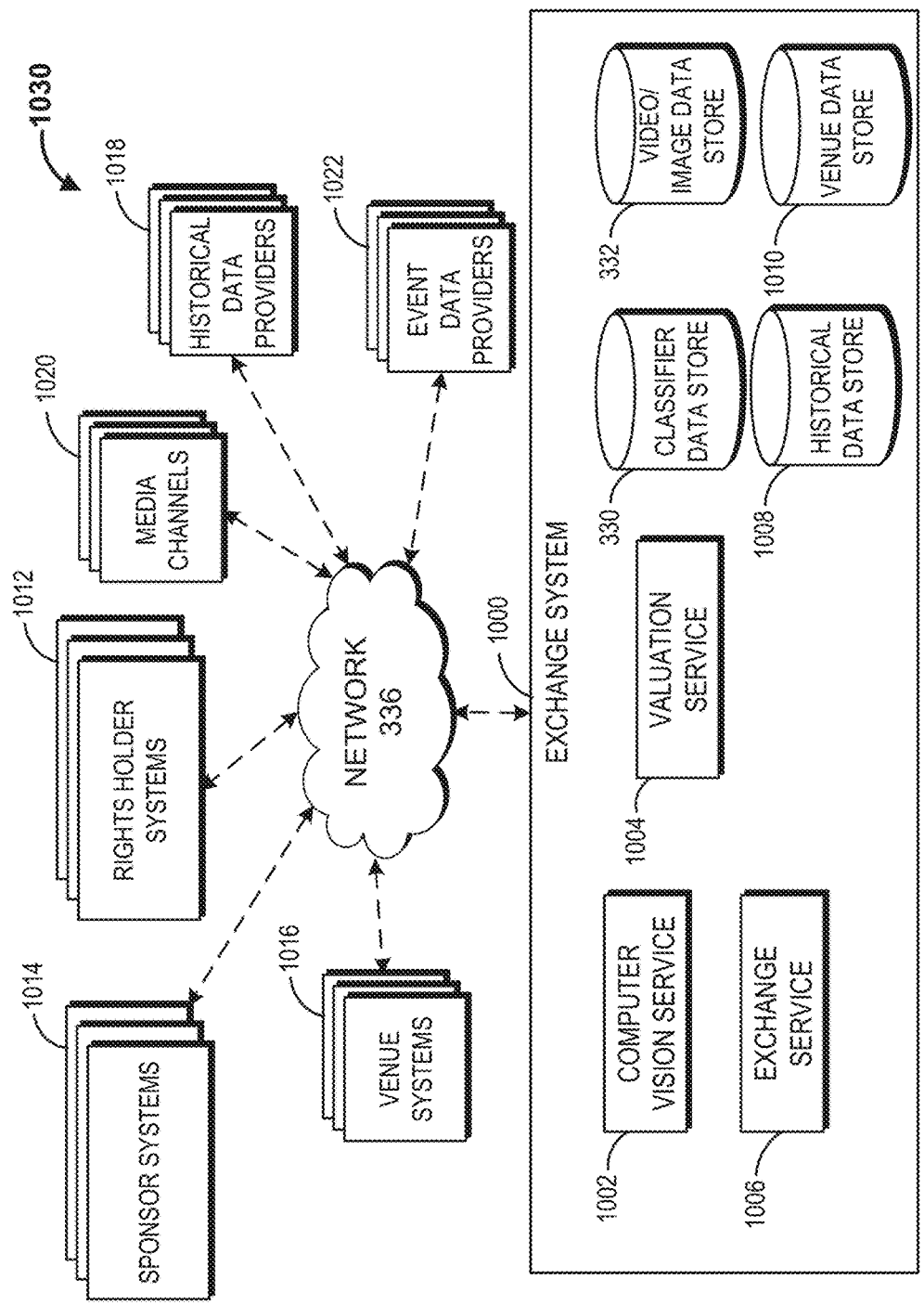
FIG. 10 is a block diagram of an exchange system for allocation of dynamic signage at one or more physical locations.

FIG. 10 is a block diagram of an exchange system for allocation of dynamic signage at one or more physical locations. The network environment 1030 can include a network 336, an exchange system 1000, sponsor systems 1014, rights holder systems 1012, venue systems 1016, media channels 1020, historical data providers 1018, and event data providers 1022. The exchange system 1000 can facilitate matching inventory of dynamic signage from the rights holder systems 1012 with requests from the sponsor systems 1014 for dynamic signage. Once matched, the exchange system 1000 and/or the rights older systems 1012 can transmit messages to the venue systems 1016 that control the dynamic signage at respective physical locations.

The exchange system 1000 can include a valuation service 1004, a computer vision service 1002, an exchange service 1006, a classifier data store 330, a video/image data store 332, a historical data store 1008, and a venue data store 1010. The exchange system 1000 can retrieve historical data, as described below, from the historical data providers 1018. The historical data may be stored in the historical data store 1008 of the exchange system 1000. The exchange system 1000 can retrieve event data, as described below, from the event data providers 1022. The exchange system 1000 can store inventory data regarding the rights holder's dynamic signage in the venue data store 1010. During one or more sporting events, the valuation service 1004 can dynamically generate valuations or bids for the time segments of the dynamic signage described below. In some embodiments, the valuations correspond to a floor price for the time segment. The valuation service 1004 can use the historical data and/or the event data to price the time segments. In some embodiments, the valuation service 1004 can communicate with the computer vision service 1002 to receive object recognition data and/or the output of computer vision techniques. The computer vision service 1002 may use the computer vision techniques described herein for processing image or video data from the media channels 1020. The computer vision service 1002 may communicate with the classifier data store 330, the video/image data store 332, and/or the media channels 1020. The valuation service 1004 may use the object recognition data and/or the output of computer vision techniques to generate valuations, as described herein. While not shown in FIG. 1, in some embodiments, components of the exchange system, such as the valuation service 1004, may be implemented by the sponsor systems 1014 or the rights holder systems 1012. The exchange service 1006 can publish the generated valuation data to the sponsor systems 1014 and/or the rights holder systems 1012.

Figure 11:
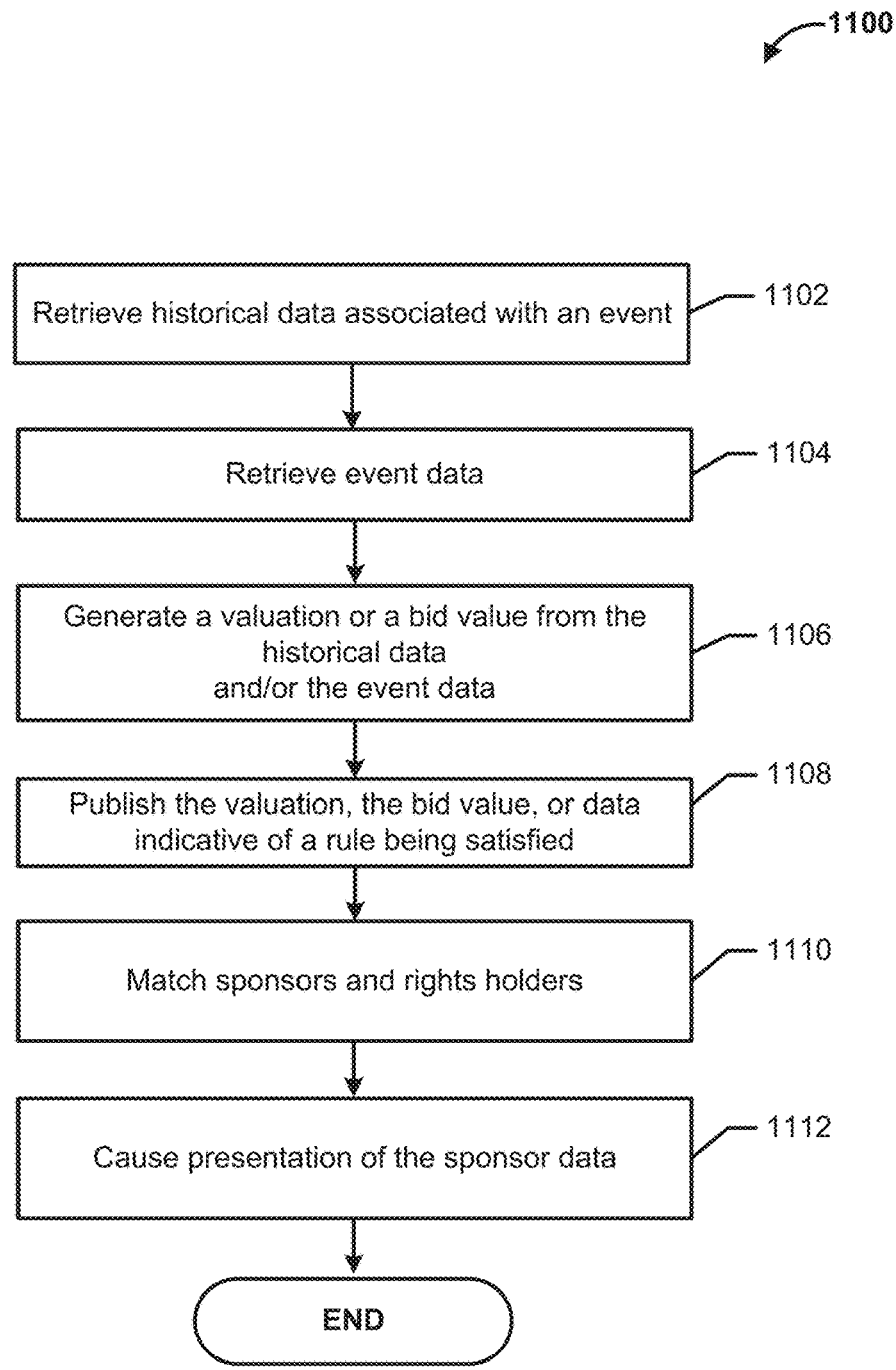
FIG. 11 is a flow diagram of an illustrative method for causing presentation of visual sponsorship data on dynamic signage at one or more physical locations, which can include valuation of time segments on the dynamic signage according to real-world events.

FIG. 11 is a flow diagram of an illustrative method 1100 that may be implemented by a computing system, such as system 302 or system 1000, for implementing an exchange to dynamically control dynamic signage at a physical location, such as a venue. The exchange may enable sponsors and rights holders to buy and sell segments of time for acquisition to present sponsorship data on the dynamic signage (such as display devices) at a physical location. An example time segment can correspond to an interval, such as a thirty-second segment or a one-minute segment, and/or can include a start time and an end time. Thus, a rights holder system may maintain an inventory of time segments for dynamic signage at a physical location where at least some of the time segments may not be assigned to a sponsor (such as at the beginning of a sporting event) and at least some of the time segments may be dynamically assigned and/or acquired by sponsors during the live sporting event, which causes the dynamic signage to present visual sponsorship data during the live sporting event.

In some embodiments, instead of a display device, the physical location can include placeholder areas where digital visual sponsorship data can be virtually projected onto the placeholder areas in a live broadcast of the sporting event, such that a person attending the sporting event may not see the virtually projected sponsorship data but a person watching the broadcast could see the virtually projected sponsorship data. Accordingly, different visual sponsorship data could be presented in the placeholder areas simultaneously depending on customization logic. For example, virtual time segments could be sold regionally such that a first sponsor could visually project their sponsorship data at the placeholder area to a first broadcast region where the sporting event is being shown, and a second sponsor could visually project different sponsorship data at the same placeholder area but to a second broadcast region that is different from the first broadcast region.

At block 1102, the system may retrieve historical data associated with a sporting event. In some embodiments, the historical data may be retrieved from one or more historical data providers. Historical data providers include sports databases that include sports data such as statistics, rosters, schedule data, gamelogs, team data, participant data (e.g., player data), awards, records, leaders, scores, titles, standings and/or other information. Additional information regarding historical data is described in further detail below with respect to FIG. 12.

At block 1104, the system retrieves the event data associated with the sporting event. The event data can represent a state of the sporting event in real time or near real time. The system can retrieve event data from an event data provider. The event data provider can include a live sports data feed that can include an API for retrieving live data regarding a sporting event. Example event data includes one or more metric values for a sporting event (e.g., a score, fouls, homeruns, penalties, etc.), one or more time values associated with the sporting event (e.g., a current time or time remaining at the sporting event), a state of the sporting event (e.g., a timeout, break, half-time, quarter, round, inning, or live gameplay), one or more participants in the sporting event, one or more metric values for a particular participant, and/or one or more metric values associated with the physical location (e.g., the venue) where the sporting event is taking place (e.g., a noise level or attendance number at the physical location). In some embodiments, event data can be retrieved from a social media network service. Example event data from a social media network service includes trending data, such as tags or keywords that are trending in social media posts within a threshold period of time from a time of the sporting event. In some embodiments, the computer vision techniques described herein may be used to dynamically determine event data associated with a sporting event in real-time or near-time based on image or video of the sporting event.

At block 1106, the system generates a valuation for a time segment from the historical data and/or the event data. For example, the exchange system can generate a valuation for a time segment. In other embodiments, a rights holder's system or a sponsor's system may generate the valuation for the time segment. Additionally or alternatively, the exchange system may accept manual valuations, such as bids or offers received from a user via user input. As described herein, the exchange system may apply one or more rules to generate a valuation for the time segment where the one or more rules may use the historical data and/or event data to value the time segment.

An algorithm for generating a valuation for a time segment can include selecting a base value for a time segment. For example, a time segment for a particular time of the season, event, time of the sporting event (e.g., Monday night, Saturday night, versus Sunday morning) may have a base starting value. The system can generate current cumulative data from initial historical data and event data. For example, the system can determine a current number of home runs for a particular player in a season by adding the home runs of a player in a season (historical data) to home runs by the player at the sporting event (event data). The system can apply a rule to the current cumulative data to determine whether the rule is satisfied. In the home run example, the rule may include logic such as: home_runs_per_season_for_player_x>=(home_run_record_per_season−threshold_runs), which can enable the system to determine whether a particular player is close to a home run record. If a rule is satisfied, then the base value for the time segment can be increased. In other embodiments, if a rule is satisfied, then the base value for the time segment can be decreased. In some embodiments, the delta for the adjustment to the base value can be a predetermined value for all time segments, a predetermined value for the particular rule, or a dynamically determined value.

Additional example algorithms for generating a valuation or a bid for a time segment may be based on rule processing of at least one of historical data or event data. The system can determine that a rule is satisfied by at least one of historical data or event data. For example, if a team or player is ranked within a threshold, the valuation or a bid value may be increased. As another example, if a metric value (e.g., a score or a decibel level at the sporting event) or a time value is within a threshold (e.g., there is less than a particular number of minutes left in a sporting event), the valuation or bid may be increased. In some embodiments, the system can include a dabase of rules, where each rule is associated with a particular sponsor and includes logic to update a bid for a time segment for the particular sponsor.

Further example algorithms for generating a valuation or a bid for a time segment may be based on rule processing of social media data. As described herein, the system may retrieve trending data from a social media network service, which may include an API. The trending data can include textual data, such as tags or keywords (e.g., "#GoTeamX" or "#ThrowBackThursday"), that are trending in social media posts within a threshold period of time from a time of the sporting event. The system can determine whether a keyword (such as one or more words or phrases) associated with the sporting event textually corresponds to the textual data of the trending data. Example textual correspondence includes the keyword being present in or partially matching the textual data of the trending data. In some embodiments, the system applies natural language processing to determine a correspondence between the keyword associated with the sporting event and the textual data of the trending data. Additional algorithms for using social media data for time segment valuation includes querying the social media network service (such as retrieving one or more posts within a certain time regarding a particular topic) and using the query results. For example, a rule can increase a valuation or bid for a time segment if particular keywords are present in the social media data, such as the text data including references to a particular team or player and references to keywords indicating potential user interest (e.g., "record," "great," or "champion"). The system may apply similar text-based rules to other data sources than social media network services, such as news feeds and news alert data sources to determine heightened potential user interest in a sporting event for valuation or bidding purposes.

Example conditional logic of the one or more rules for generating valuations or bids includes one or more of the following.

If a team or participant is ranked within a threshold (e.g., if the home team and away team are each ranked in the top five in the league, or if the away team is ranked in the top five in the league).

If the sporting event is a playoff game or a championship event.

If the sporting event is a rubber match or game five or seven in a series.

If the score is within a threshold number of points.

If there is less than a threshold time left in the sporting event.

If the sporting event is in live gameplay or not (e.g., if it's during a timeout, a display device is not likely to be associated with a game highlight).

If a team or participant from the sporting event was "trending" on social media within a threshold period of time before the sporting event.

If a team or participant is close to breaking a record or surpassing a milestone.

If a particular participant (e.g., a player) is at the sporting event.

If a participant has a metric value (e.g., number of points, rebounds, assists) over a threshold. For example, the participant could be within a threshold of getting a triple double or a hat trick.

If the physical location has a noise level (e.g., a decibel level) or a gate attendance greater than a threshold.

In some embodiments, the one or more rules may dynamically change and/or select the sponsorship data to be presented on the dynamic signage based on conditional logic. The system can determine sponsorship presentation data associated with the rule that has been satisfied. The system can execute logic to dynamically select sponsorship presentation data among two or more presentation options. In some embodiments, the system can dynamically generate sponsorship based on the rule that has been satisfied. For example, if a close game logic is triggered, then the rule may indicate that a particular message should be displayed on the dynamic signage (e.g., "Feeling Anxious? Grab a Candy-Bar"). The system can further execute logic with template data to generate customized presentation data. For example, if a particular player achieves a record or scores over a certain threshold, the system can execute logic to insert a current score into a message such as "<score variable>!Go! [Sponsor Name]".

At block 1108, the system publishes the valuation or bid on the exchange. The system can transmit the valuation or bid to one or more computing devices, such as computing devices for sponsors or rights holders. The sponsor systems can receive the valuations. The rights holder systems or the exchange can receive the bids. In some embodiments, the sponsor systems may present the valuations in a user interface that can be accepted or ignored by a user on the sponsor side. Additionally or alternatively, automated processes may accept or ignore the valuations for time segments according to one or more sponsor heuristics for acquiring time segments for display visual sponsorship data. As described herein, sponsors may be presented overall sponsor valuations, media value percentage metrics, near-time or real-time media values across one or more media channels, such as broadcast networks, streaming networks, digital networks, and social media networks. Thus, sponsors can use the provided media value data to determine whether or not to acquire the time segments via the exchange. In some embodiments, the exchange may restrict access to certain marketplaces of time segments for a predetermined approved list of sponsors. Additionally or alternatively, after a threshold period of time without being acquired, time segment inventory may be released to other sponsors that are not on a priority list of sponsors.

In some embodiments, the system does not publish the valuations or bids on the exchange. For example, the exchange may automatically execute bidding rules for sponsors that increase bids based on programmatic logic that certain moments may be of additional value to a sponsor. The exchange may automatically select winning bidders and may cause presentation of sponsorship data associated with the winner and/or the one or more satisfied rules. In other embodiments, the system transmits an indication that a rule is satisfied to one or more computing devices of one or more sponsors. Thus, the sponsors may submit bids to acquire time segments based on the indicators, which may indicate potential moments of value to the sponsors.

At block 1110, sponsors are matched to rights holders to acquire time segments based on the valuations or bids. In response to receiving the valuation, the sponsor system can transmit a request for the first time segment for the valuation price or another price. The rights holder system or the exchange system can accept the request from the sponsor to assign the selected time segment to the sponsor. In other embodiments, the sponsor system can generate a bid and transmit the bid to the exchange system. The rights holder systems can possibly accept the offer from the sponsors. In some embodiments, the exchange includes automatic matching rules from sponsors and rights holders and does not need to communicate with external sponsors' or rights holders' systems to conduct the matching.

At block 1112, the system can cause the dynamic signage at the physical location to present the corresponding sponsorship data for the acquired time segment. The exchange system or a rights holder system can transmit instructions to venue systems to dynamically present selected sponsorship data on the dynamic signage for the time segment. In some embodiments, the sponsorship data is presented on a display device at the physical location such that physical attendees can view the sponsorship data. In other embodiments, the sponsorship data is virtually presented at a placeholder area such that broadcast or streaming viewers of the sporting event can see the sponsorship data but physical attendees may not be able to see the visual sponsorship data.

FIG. 12 illustrates historical data for use by the exchange system in generating valuations or bids of time segments on the dynamic signage. The data environment 1200 can include data stores 1202, 1204, and 1206. The data stores 1202, 1204, and 1206, shown in the form of tables, are illustrative and not meant to be limiting (e.g., while depicted in FIG. 12 as tables for illustrative purposes, a variety of data structures may be used for storage of the data). In some embodiments, different historical data may be used and/or there may be fewer or additional historical data stores. For example, the data schema for historical sporting data may be logically grouped by sport or by any other logical grouping. The standings data store 1202 includes example standings data for teams or participants of a sporting event. As illustrated the standings data store 1202 includes wins, losses, standings, and consecutive wins data. The records data store 1204 includes example records data, such as all-time wins records and consecutive wins records. Accordingly, the system can programmatically apply the valuation or bidding rules by accessing and/or combining the historical data. For example, in the context of a sporting event, a rule (such as by using the standings data store 1202 and the records data store 1204) can determine that Team 3 has 24 total wins and is within a threshold number of the all-time-wins record, 30, and, therefore, a time segment for the dynamic signage at the sporting event with Team 3 may receive a higher valuation as a result.

As another example, in the context of a sporting event, a different rule can determine that Team 3 (such as by using the standings data store 1202 and the records data store 1204) has 15 consecutive wins and is within a threshold number of the consecutive-time-wins, 17, and, therefore, a time segment for the dynamic signage at the sporting event with Team 3 may receive a higher valuation as a result. As described herein, the system can use the standings column data in the data store 1202 to determine higher or lower valuations data for dynamic signage of sporting events that have the respective teams or participants. For example, teams or participants that are ranked within a certain threshold may cause corresponding time segments to receive higher valuations.

An example rule for dynamic valuation of signage can use the participant or player data store 1206, which includes points for the season and average points per sporting event or game. Thus, another rule can combine near-real time event data for the sporting event (such as Participant 1 scoring 1 point at the sporting event) with the historical data (such as Participant 1's 15 points for the season prior to the sporting event) to generate current cumulative data (such as Participant 1 scoring 16 total points for the season based on the dynamic calculation during the game) that may be within a threshold of the rule that triggers an increased valuation for a time segment of dynamic signage at the sporting event that includes the particular sporting participant.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more general purpose computers or processors. The code modules may be stored in any type of non-transitory computer-readable medium or other computer storage device. Some or all the methods may alternatively be embodied in specialized computer hardware. In addition, the components referred to herein may be implemented in hardware, software, firmware or a combination thereof.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks, modules, and algorithm elements described in connection with the embodiments disclosed herein can be implemented as electronic hardware, computer software, or combinations of both. To clearly illustrate this interchangeability of hardware and software, various illustrative components, blocks, modules, and elements have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, or algorithm described in connection with the embodiments disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A computing system for analyzing distributed media using computer vision, the computing system comprising:
   a memory; and
   a processor in communication with the memory and configured with processor-executable instructions to perform operations comprising:
   retrieving a first plurality of media items posted to one or more social media network services, wherein the first plurality of media items include at least one of images or videos;
   retrieving a second plurality of media items broadcast by one or more broadcast networks, wherein the second plurality of media items include at least one of images or videos;
   identifying, from the first plurality of media items, at least a first media item that depicts a first object associated with a first sponsor, wherein the first media item is identified to depict the first object at least in part by a classifier trained to identify the first object associated with the first sponsor, wherein a feature of the first media item is provided as input to the classifier;
   identifying, from the second plurality of media items, at least a second media item that depicts the first object associated with the first sponsor;
   determining a first media cost equivalent associated with the first media item as posted to the one or more social media network services;
   determining a second media cost equivalent associated with the second media item as broadcast by the one or more broadcast networks;
   determining a first percentage of the first media cost equivalent, wherein the first percentage is determined based at least in part on at least one of size, clarity, duration or position of the first object or a second object in the first media item;
   determining a second percentage of the second media cost equivalent, wherein the second percentage is determined based at least in part on at least one of size, clarity, duration or position of the first object or a third object in the second media item; and
   calculating a sponsor valuation, wherein the sponsor valuation is calculated based at least in part on a combination of: the first media cost equivalent adjusted by the first percentage, and the second media cost equivalent adjusted by the second percentage.

2. The computing system of claim 1, wherein determining the first media cost equivalent further comprises determining a relationship M of the first media item substantially as:

$$M=((E*CPEE)*W_1)+((R*CPME)*W_2),$$

wherein:
   $W_1$ and $W_2$ are constants,
   E comprises a quantity of engagements with the first media item,
   CPEE comprises a cost per engagement equivalent for the first media item,
   R comprises a quantity of views or shares of the first media item, and
   CPME comprises a cost per thousand equivalent for the first media item.

3. The computing system of claim 1, wherein determining the first media cost equivalent further comprises determining a relationship M of the first media item substantially as:

$$M=(V*NCPV*CE*W_1)+(E*NCPE*W_2),$$

wherein:
   $W_1$ and $W_2$ are constants,
   V comprises a quantity of views of the first media item,
   NCPV comprises a network cost per view for the first media item,
   CE comprises a cost equivalent for a unit of media,
   E comprises a quantity of engagements with the first media item, and
   NCPE comprises a network cost per engagement for the first media item.

4. The computing system of claim 1, wherein determining the first percentage further comprises:
   calculating a percentage value from at least one of:
   a size of the first object in the first media item relative to a frame of the first media item,
   a clarity of the first object in the first media item relative to a reference object,
   an elapsed time of the first object in the first media item relative to a total duration of the first media item,
   a quantity of one or more objects different than the first object depicted in the first media item, the one or more objects comprising the second object associated with a second sponsor, or
   a position of the first object in the first media item relative to the reference object in a reference frame,
   wherein the percentage value is assigned to the first percentage.

5. The computing system of claim 1, wherein determining the first percentage further comprises:
   retrieving a default percentage for a time based deduction;
   identifying one or more playback positions of the first object in the first media item;
   identifying, from the one or more playback positions, a first chronological appearance of the first object in the first media item;
   calculating an adjusted percentage for the time based deduction from the default percentage, the first chronological appearance, and a total duration of the first media item, wherein the adjusted percentage results in a greater time based deduction where the first chronological appearance is closer to an end of the first media item, and
   wherein the first percentage comprises the adjusted percentage for the time based deduction.

6. The computing system of claim 1, wherein determining the first percentage further comprises:
   providing a second feature of the first media item as second input to a second classifier associated with one or more objects, wherein the second classifier is trained to output a likelihood that the first object corresponds to a physical object at a venue or the first object corresponds to a digital overlay in a first image or video of the venue; and
   determining, from the likelihood, a percentage value representing potential exposure of the first object as indicated by the first media item, wherein the first percentage comprises the percentage value.

7. A computing system comprising:
   a memory; and
   a processor in communication with the memory and configured with processor-executable instructions to perform operations comprising:
   retrieving a plurality of media items, wherein the plurality of media items include at least one of images or videos, and wherein the plurality of media items are retrieved from at least one of: one or more social media network services, one or more streaming media networks, or one or more broadcast networks;

identifying, from the plurality of media items, at least a first media item that depicts a first object associated with a first sponsor, wherein the first media item is identified to depict the first object at least in part by a classifier trained to identify the first object associated with the first sponsor, wherein a feature of the first media item is provided as input to the classifier;

determining a media cost equivalent associated with the first media item as distributed by at least one of:
  being posted to the one or more social media network services,
  being streamed by the one or more streaming media networks, or
  being broadcast by the one or more broadcast networks;

determining a percentage of the media cost equivalent, wherein the percentage is determined based at least in part on at least one of size, clarity, duration or position of the first object or a second object in the first media item; and calculating a sponsor valuation, wherein the sponsor valuation is calculated based at least in part on the media cost equivalent adjusted by the percentage.

8. The computing system of claim 7, wherein determining the media cost equivalent further comprises:
  calculating a first cost from (i) a quantity of engagements with the first media item and (ii) a cost per engagement equivalent for the first media item;
  calculating a second cost from (i) a quantity of views or shares of the first media item and (ii) a cost per thousand equivalent for the first media item; and
  calculating a third cost by combining the first cost and the second cost,
  wherein the third cost is assigned to the media cost equivalent.

9. The computing system of claim 7, wherein determining the media cost equivalent further comprises:
  calculating a first cost from (i) a quantity of engagements with the first media item and (ii) a network cost per engagement equivalent for the first media item;
  calculating a second cost from (i) a quantity of views or shares of the first media item and (ii) a network cost per view for the first media item; and
  calculating a third cost by combining the first cost and the second cost,
  wherein the third cost is assigned to the media cost equivalent.

10. The computing system of claim 7, wherein determining the percentage further comprises:
  calculating a percentage value from at least one of:
    a size of the first object in the first media item relative to a frame of the first media item,
    a clarity of the first object in the first media item relative to a reference object,
    an elapsed time of the first object in the first media item relative to a total duration of the first media item,
    a quantity of one or more objects different than the first object depicted in the first media item, the one or more objects comprising the second object associated with a second sponsor, or
    a position of the first object in the first media item relative to the reference object in a reference frame,
  wherein the percentage value is assigned to the percentage.

11. The computing system of claim 7, wherein determining the percentage further comprises:
  retrieving a default percentage for a time based deduction;
  identifying one or more playback positions of the first object in the first media item;
  identifying, from the one or more playback positions, a first chronological appearance of the first object in the first media item;
  calculating an adjusted percentage for the time based deduction from the default percentage, the first chronological appearance, and a total duration of the first media item, wherein the adjusted percentage results in a greater time based deduction where the first chronological appearance is closer to an end of the first media item, and
  wherein the first percentage comprises the adjusted percentage for the time based deduction.

12. The computing system of claim 7, wherein determining the percentage further comprises:
  providing a second feature of the first media item as second input to a second classifier associated with one or more objects, wherein the second classifier is trained to output a likelihood that the first object corresponds to a physical object at a venue or the first object corresponds to a digital overlay in a first image or video of the venue; and
  determining, from the likelihood, a percentage value representing potential exposure of the first object as indicated by the first media item, wherein the first percentage comprises the percentage value.

13. A computer-implemented method comprising:
  retrieving a plurality of media items, wherein the plurality of media items include at least one of images or videos, and wherein each of the plurality of media items has been distributed by at least one of:
    being posted to one or more social media network services,
    being streamed by one or more streaming media networks, or
    being broadcast by one or more broadcast networks;
  identifying, from the plurality of media items, at least a first media item that depicts a first object associated with a first sponsor, wherein the first media item is identified to depict the first object at least in part by a classifier trained to identify the first object associated with the first sponsor, wherein a feature of the first media item is provided as input to the classifier;
  determining a media cost equivalent associated with the first media item, wherein the media cost equivalent is based at least in part on data associated with a social media network, a streaming media network, or a broadcast network by which the first media item has been distributed;
  determining at least one of size, clarity, duration or position of the first object or a second object in the first media item based on an automated analysis of the image data or video data of the first media item;
  determining a percentage of the media cost equivalent, wherein the percentage is determined based at least in part on the at least one of size, clarity, duration or position of the first object in the first media item; and
  calculating a sponsor valuation, wherein the sponsor valuation is calculated based at least in part on the media cost equivalent adjusted by the percentage.

14. The computer-implemented method of claim 13, wherein the data associated with the social media network, the streaming media network, or the broadcast network comprises at least one of: a quantity of engagements with the first media item or a quantity of shares of the first media item.

15. The computer-implemented method of claim 13, wherein determining the media cost equivalent is further based at least in part on a quantity of engagements with the first media item, a cost per engagement equivalent for the first media item, a quantity of views or shares of the first media item, and a cost per thousand equivalent for the first media item.

16. The computer-implemented method of claim 13, wherein determining the media cost equivalent is further based at least in part on a quantity of engagements with the first media item, a network cost per engagement equivalent for the first media item, a quantity of views or shares of the first media item, and a network cost per view for the first media item.

17. The computer-implemented method of claim 13, wherein determining the percentage further comprises:
  calculating a percentage value from at least one of:
    a size of the first object in the first media item relative to a frame of the first media item,
    a clarity of the first object in the first media item relative to a reference object,
    an elapsed time of the first object in the first media item relative to a total duration of the first media item,
    a quantity of one or more objects different than the first object depicted in the first media item, the one or more objects comprising the second object associated with a second sponsor, or
    a position of the first object in the first media item relative to the reference object in a reference frame,
  wherein the percentage value is assigned to the percentage.

18. The computer-implemented method of claim 13, further comprising:
  generating a user interface comprising:
    the sponsor valuation,
    a first valuation associated with the first sponsor for a first social media network,
    a second valuation associated with the first sponsor for a second broadcast network, and
    for each of the first social media network and the second broadcast network, at least two or more of: a volume, a number of impressions, or a number of engagements; and
  causing presentation of the user interface.

19. The computer-implemented method of claim 13, further comprising:
  generating, for a rights holder, a report comprising:
    the sponsor valuation, and
    for each of a plurality of objects associated with the first sponsor that have been identified in image data or video data of the plurality of media items, at least two or more of: a number of posts, a reach estimate, a number of engagements, or a media item valuation; and
  causing presentation of the report.

* * * * *